(12) United States Patent
Christensen et al.

(10) Patent No.: US 12,290,079 B2
(45) Date of Patent: May 6, 2025

(54) HIGH-PROTEIN, ACIDIFIED, LIQUID DAIRY PRODUCT HAVING A REDUCED VISCOSITY, METHOD OF PRODUCING IT, AND RELATED INGREDIENTS

(71) Applicant: Arla Foods Amba, Viby J (DK)

(72) Inventors: Britt Christensen, Århus C (DK); Peter Langborg Wejse, Aarhus N (DK); Søren Bang Nielsen, Herning (DK); Robert Muir, Videbæk (DK)

(73) Assignee: Arla Foods Amba, Viby J (DK)

( * ) Notice: Subject to any disclaimer, the term of this patent is extended or adjusted under 35 U.S.C. 154(b) by 450 days.

(21) Appl. No.: 17/713,806

(22) Filed: Apr. 5, 2022

(65) Prior Publication Data
US 2022/0225629 A1    Jul. 21, 2022

Related U.S. Application Data

(62) Division of application No. 16/486,737, filed as application No. PCT/EP2018/053665 on Feb. 14, 2018, now Pat. No. 11,324,229.

(30) Foreign Application Priority Data

Feb. 17, 2017   (EP) .................................. 17156770

(51) Int. Cl.
*A23C 21/02*     (2006.01)
*A23C 21/06*     (2006.01)
(Continued)

(52) U.S. Cl.
CPC .............. *A23C 21/02* (2013.01); *A23C 21/06* (2013.01); *A23C 21/10* (2013.01); *A23J 3/08* (2013.01)

(58) Field of Classification Search
CPC ......... A23C 21/02; A23C 21/06; A23C 21/10; A23J 3/08
(Continued)

(56) References Cited

U.S. PATENT DOCUMENTS 5,096,731 A * 3/1992 Singer ...................... A23J 3/00
                                                  426/583
5,882,705 A   3/1999 Sato et al.
(Continued)

FOREIGN PATENT DOCUMENTS

CN   105792659   7/2016
CN   105792663   7/2016
(Continued)

OTHER PUBLICATIONS

Rawle, Alan: "Basic principles of particle size analysis", Internet, Jul. 24, 2017, pp. 1-8, Retrieved on Jul. 24, 2017.
(Continued)

*Primary Examiner* — Brent T O'Hern
(74) *Attorney, Agent, or Firm* — Lisa Mueller; Casimir Jones SC (57) ABSTRACT

The present invention relates to a new method of producing a high-protein, acidified, liquid, dairy product. The invention furthermore relates to new high-protein acidified, liquid dairy product, to protein/mineral compositions and uses of these for producing liquid dairy products having a high-protein content and a low viscosity.

4 Claims, 1 Drawing Sheet

(51) Int. Cl.
   *A23C 21/10* (2006.01)
   *A23J 3/08* (2006.01)
(58) Field of Classification Search
   USPC .......................................................... 426/41
   See application file for complete search history.

(56) References Cited

U.S. PATENT DOCUMENTS

| | | | |
|---|---|---|---|
| 6,605,311 | B2 | 8/2003 | Villagran et al. |
| 2009/0137554 | A1 | 5/2009 | Mehlmann et al. |

FOREIGN PATENT DOCUMENTS

| | | | | |
|---|---|---|---|---|
| DE | 19950240 | | 5/2001 | |
| DE | 10 2012 216 990 A1 | | 3/2013 | |
| DE | 102012216990 | | 3/2013 | |
| EP | 0520581 A1 | | 12/1992 | |
| EP | 2862446 | | 4/2014 | |
| JP | 2016-533726 | | 11/2016 | |
| JP | 2016-533726 A | | 11/2016 | |
| JP | 7212624 B2 | | 1/2023 | |
| WO | 2006058538 | † | 6/2006 | |
| WO | 2006058538 A1 | | 6/2006 | |
| WO | WO 2007/108709 | | 9/2007 | |
| WO | WO 2007/110411 | | 10/2007 | |
| WO | WO 2008/063115 | | 5/2008 | |
| WO | 2010120199 A1 | | 10/2010 | |
| WO | WO 2010/120199 | | 10/2010 | |
| WO | WO 2011/003426 | | 1/2011 | |
| WO | 2011066880 A2 | | 6/2011 | |
| WO | 2012081971 A1 | | 6/2012 | |
| WO | WO 2012/081982 | | 6/2012 | |
| WO | WO 2013/057230 | | 4/2013 | |
| WO | WO 2013/057231 | | 4/2013 | |
| WO | 2013065014 A1 | | 5/2013 | |
| WO | 2013116687 A1 | | 8/2013 | |
| WO | WO 2013/187519 | | 12/2013 | |
| WO | WO 2013/187519 A1 | | 12/2013 | |
| WO | 2015059243 A1 | | 4/2015 | |
| WO | 2015059246 A1 | | 4/2015 | |
| WO | 2015059248 | † | 4/2015 | |
| WO | WO 2015/059243 | | 4/2015 | |
| WO | WO-2015059248 A1 | * | 4/2015 | ............. A23C 21/00 |
| WO | WO 2016/030581 | | 3/2016 | |
| WO | 2016075332 | † | 5/2016 | |

OTHER PUBLICATIONS

Zhu et al: "Effects of calcium and magnesium ions on aggregation of whey protein isolate and its effect on foaming properties" Journal of Food and Agricultural Chemistry, vol. 42, No. 4, 1994, pp. 856-862.
Chung, C. et al; Development of Reduced-calorie foods: Microparticulated whey proteins as fat mimetics in semi-solid food emulsions_Food Research Int_56_2014_pp. 136-145.
DiRienzo, D. (editor); Whey products, milk minerals and dairy calcium New Findings, Benefits and Applications, U.S. Dairy Export Council, 2001.
Morr, C.V. et al; A Collaborative Study to Develop a Standardized Food Protein Solubility Procedure, Journal of Food Science_50_ 1985_pp. 1715-17187.
Münchbach, Dr. M. et al; Calcium Fortification in Dairy Products, Food Marketing & Technology, February 2010_pp. 4-8.
Florida Bulk Sales, Inc., Product Leaflet: Organic Strawberry Juice Concentrate 65 Brix.
Greenwood Associates, Inc, Product Leaflet: Strawberry Juice Concentrate 65 Brix.
Davisco Foods International, Inc, Product leaflet: Whey Protein Concentrate 80% (Protein Content 80% Dry Basis), version 07F-0604.
Smith, K., Dried Dairy Ingredients, Wisconsin Center for Dairy Research, 2008, pp. 42-45.
Souci S. et al, Food Compositions and Nutrition Tables, 7th edition, Wissenschaftliche Vertragsgesellschaft mbh, Stuttgart, 2008, pp. 23, 52 and 54.
Thompson, A. et al, editors, Milk Proteins: From Expression to Food, Elsevier Inc., 2009, pp. 28-29 and 330.
Wijayanti, H.B. et al, Stability of Whey Proteins during Thermal Processing—A Review, Comprehensive Reviews in Food Science and Food Safety_13_2014_pp. 1235-1251.
Zayas, J.F., Functionality of Proteins in Food, Springer-Verlag Berlin Heidelberg, 1997, p. 9.
Karen Smith, Dried Dairy Ingredients, Wisconsin Center for Dairy Research, May 15, 2008.
SPX Corporation, APV LeanCreme(TM) Microparticulation of Whey Protein with SPX Flow Technology, White Paper, Issued Nov. 2012.
Ranganathan Kumar, et al., Whey Proteins: A potential ingredient for food industry—A review, Asian Journal of Dairy and Food Research, vol. 37 issue 4 (Dec. 2018) : 283-290.
U.S. Department of Agriculture, USDA FoodData Central Food Details, Cream, heavy, Data Type: Foundation, Food Category: Dairy and Egg Products, FDC ID: 2346386, NDB No. 1053, FDC Published: Oct. 28, 2022.
U.S. Department of Agriculture, USDA FoodData Central Food Details, Milk, nonfat, fluid, with added vitamin A and vitamin D (fat free or skim), Data Type: Foundation, Food Category: Dairy and Egg Products, FDC ID: 746776 NDB No. 1085, FDC Published: Dec. 16, 2019.
Florida Bulk, Nutritional Information, Strawberry Juice Concentrate 65 BRIX, Nov. 2024, available at https://floridabulksales.com/wp-content/uploads/Strawberry-Juice-Concentrate-65-Brix-Nutritional-Information-1.pdf.
U.S. Dairy Export Council, "Milk Minerals, Product Definition," 2015.
European Patent Office, Letter Accompanying Subsequent filed items—opposition to EP Patent No. EP3582622B1, dated Jan. 1, 2025.
"Yogurt, plain, whole milk" USDA, Agricultural Research Service, Data Type: Foundation, FDC ID: 2259793, NDB No. 1116, pp. 1-4 (published Apr. 28, 2022) (fdc.nal.usda.gov/fdc-app.html?query=171284#/food-details/2259793/nutrients).†
U. Ruth Charrondiere, David Haytowitz and Barbara Stadlmayr "FAO/INFOODS Density Database Version 2.0 (2012)" FAO/INFOODS Databases, pp. 1-21 (published 2012) (www.fao.org/3/ap815e/ap815e.pdf).†
Emilia Magdaleno Morales Henrysson "The effect of mechanical shear in ambient yoghurt" Master Thesis in Food Technology and Nutrition, Department of Food Technology, Engineering and Nutrition, Lund University, Sweden, 30 ECTS Jun. 2016, pp. 1-49 (published Jun. 26, 2016) (lup.lub.lu.se/student-papers/search/publication/8881577).†

* cited by examiner
† cited by third party

HIGH-PROTEIN, ACIDIFIED, LIQUID DAIRY PRODUCT HAVING A REDUCED VISCOSITY, METHOD OF PRODUCING IT, AND RELATED INGREDIENTS

FIELD OF THE INVENTION

The present invention relates to a new method of producing a high-protein, acidified, liquid, dairy product. The invention furthermore relates to new high-protein acidified, liquid dairy product, to protein/mineral compositions and uses of these for producing liquid dairy products having a high-protein content and a low viscosity.

BACKGROUND

Within the recent years denatured, microparticulated whey protein concentrates have been used as ingredients for producing high-protein acidified liquid dairy products. These protein preparations are an important source for producing nutritional supplements for persons in need of extra protein, be it elderly malnourished people or sick people requiring protein for increased muscle build-up e.g. after surgery.

WO2015/059248A1 discloses a high-protein, acidified dairy product, containing a denatured whey protein composition having a low content of soluble whey protein but high total protein content. Casein may form a significant part of the total protein. Caseinomacropeptide is shown to play an important role in keeping the viscosity of the product low.

EP2862446A1 relates to a method of manufacturing calcium enriched modified whey protein compositions having a neutral pH of 6.8-8.0, which can be pasteurised under conditions of 80 to 150 degrees C. for a period of 30 minutes to 1 second. The calcium content of the raw material whey liquid that is subjected to the heat treatment is from 400-700 mg/100 g of solids. The protein content is low, i.e. not more than 1.3% by mass.

WO 2010/120199 discloses a method for preparing a modified whey protein concentrate which involves heat-treating the whey protein feed under conditions of turbulent flow. The modified WPC can be used for the manufacture of e.g. process cheese or yoghurts wherein the modified whey protein concentrate is supplemented with significant amounts of milk protein.

DE 10 2012 216990 A1 discloses a process for microparticulation of whey protein by thermal precipitation of whey protein. The method comprises heating the whey proteins below their isoelectric points for protein unfolding, and carrying out whey protein precipitation only when the pH is increased in the isoelectric region after the thermal protein unfolding, where the protein content is less than 0.60 wt. %, and the mineral content of the starting substrate is less than 0.55 wt. %. The microparticles are formed without mechanical stress.

SUMMARY OF THE INVENTION

Preparation of high protein, liquid dairy products having a high content of whey protein but still having a reduced viscosity, is challenging. It is generally known that fortifying a high-protein dairy product with minerals such as calcium and magnesium makes it even more challenging as it increases the viscosity of the final product and affects the taste.

The present inventors have surprisingly discovered that preparation of high protein, liquid dairy products having a high content of whey protein and enriched with minerals e.g. $Ca^{2+}$ and $Mg^{2+}$ cations can be obtained without increasing the viscosity of the final product. This makes it possible to prepare products that are easier to drink and to increase the concentration of protein in nutritional beverages.

Thus, an aspect of the invention pertains to a method of preparing a high protein, acidified, liquid dairy product, comprising the steps of
  a) providing a liquid composition
    comprising a total amount of whey protein of at least 4% (w/w) of which at least 30% (w/w) is in the form of insoluble whey protein particles,
    having volume weighted mean particle diameter of at most 50 micron,
    wherein at least 60% (w/w) of the total protein is whey protein, preferably at least 80% (w/w), and even more preferably at least 90% (w/w),
  b) subjecting the liquid composition of step a) to at least one acidification step using an acidifying agent and to at least one heat-treatment step in any order, thereby obtaining an acidified heat-treated liquid composition,
  c) optionally, homogenizing the acidified heat-treated liquid composition, and
  d) optionally, packaging an acidified dairy product derived from the acidified heat-treated liquid composition of step b) or step c),
  wherein $Ca^{2+}$ and $Mg^{2+}$ cations are present prior to step b and/or added during or after step b) in an amount sufficient to obtain a weight ratio between the total amount of protein and the total amount of $Ca^{2+}$ and $Mg^{2+}$ cations of at most 100 in the acidified heat treated liquid composition.

Another aspect of the invention pertains to a high protein, acidified, liquid dairy product:
  comprising a total amount of whey protein of at least 4% (w/w) of which at least 30% is in the form of insoluble whey protein particles,
  having volume weighted mean particle diameter of at most 50 micron,
  wherein at least 60% (w/w) of the total protein is whey protein, preferably at least 80% (w/w), and even more preferably at least 90% (w/w),
  having a weight ratio between the total amount protein and the total amount of $Ca^{2+}$ and $Mg^{2+}$ cations of at most 100.

Yet another aspect of the invention pertains to a protein/mineral powder
  comprising a total amount of whey protein at least 20% (w/w) of which at least 30% (w/w) is in the form of insoluble whey protein particles
  having volume weighted mean particle diameter of at most 50 micron when suspended in water
  wherein at least 60% (w/w) of the total protein is whey protein, preferably at least 80% (w/w), and even more preferably at least 90% (w/w), and
  having a weight ratio between the total amount of protein and the total amount of Ca2+ and Mg2+ cations of at most 100.

A further aspect of the invention pertains to use of the protein/mineral powder described herein as an ingredient for producing a high-protein, acidified, liquid dairy product having a viscosity of at most 2500 cP at 5 degrees C. and at a shear rate of 300/s.

DETAILED DESCRIPTION

An aspect of the invention pertains to a method of preparing a high-protein, acidified, liquid dairy product, comprising the steps of
a) providing a liquid composition
comprising a total amount of whey protein of at least 4% (w/w) of which at least 30% (w/w) is in the form of insoluble whey protein particles
having volume weighted mean particle diameter of at most 50 micron
wherein at least 80% (w/w) of the total protein is whey protein
b) subjecting the liquid composition of step a) to at least one acidification step using an acidifying agent and to at least one heat treatment step in any order, thereby obtaining an acidified heat-treated liquid composition,
c) optionally, homogenizing the acidified heat-treated liquid composition, and
d) optionally, packaging the acidified dairy product derived from the acidified heat-treated liquid composition of step b) or step c),
wherein Ca$^{2+}$ and Mg$^{2+}$ cations are present prior to step b and/or added during or after step b) in an amount sufficient to obtain a weight ratio between the total amount of protein and the total amount of Ca$^{2+}$ and Mg$^{2+}$ cations of at most 100 in the acidified, heat-treated, liquid composition.

In the context of the present invention, the term "high-protein" means that the composition or product in question contains a total amount of protein of at least 4% (w/w).

In the context of the present invention, the term "acidic" means that the composition or product in question has a pH of at most 5.5 at 25 degrees C. pH values provided herein are measured at 10 degree C. unless stated otherwise.

In the context of the present invention, the term "liquid composition" pertains to a water-containing composition that is pourable and has a liquid appearance, but may contain dispersed particles and other solids in addition to water. The liquid composition preferably comprises water in an amount of at least 50% (w/w).

In the context of the present invention, the term "whey protein" relates to the proteins which are present in the serum phase of either milk or coagulated milk. The proteins of the serum phase of milk are also sometimes referred to as milk serum proteins or ideal whey proteins. When used herein, the term "whey protein" encompasses both the native whey proteins and whey protein in denatured and/or aggregated form.

In the context of the present invention, the term "whey" relates to the liquid composition which is left when casein has been removed from milk.

Casein may e.g. be removed by microfiltration providing a liquid permeate which is free of, or essentially free of, micellar casein, but contains the native whey proteins. This liquid permeate is sometimes referred to as ideal whey, serum or milk serum.

Alternatively, the casein may be removed from milk by contacting a milk composition with rennet enzyme, which cleavages kappa-casein into para-kappa-casein and the peptide caseinomacropeptide (CMP), thereby destabilising the casein micelles and causing casein to precipitate. The liquid surrounding the rennet-precipitated casein is often referred to as sweet whey and contains CMP in addition to the whey proteins which are normally found in milk.

Casein may also be removed from milk by acid precipitation, i.e. reducing the pH of the milk below pH 4.6 which is the isoelectric point of casein and which causes the casein micelles to disintegrate and precipitate. The liquid surrounding the acid precipitated casein is often referred to as acid whey or casein whey and is substantially free of CMP.

In the context of the present invention, the terms "native alpha-lactalbumin", "native beta-lactoglobulin", "native CMP", "soluble alpha-lactalbumin", "soluble beta-lactoglobulin" or "soluble CMP" pertain to soluble, non-denatured alpha-lactalbumin, beta-lactoglobulin or CMP which preferably has approximately the same retention time as the standard of alpha-lactalbumin, beta-lactoglobulin or CMP when assayed according to Example 1.2.

The whey proteins used in the present invention are preferably whey proteins derived from mammalian milk, such as e.g. milk from human, cow, sheep, goat, buffalo, camel, llama, horse and/or deer. In some preferred embodiments of the invention, the whey proteins are bovine whey proteins.

In the context of the present invention, the term "insoluble whey protein particles" pertains to insoluble particles of denatured whey protein. The insoluble whey protein particles can be separated by centrifugation at 62000 g for 30 min. The insoluble whey protein particles are typically produced by heating a solution of whey protein at an appropriate pH (e.g. pH 5-8) while subjecting the solution to a high degree of shear. The shear may be provided by mechanical shearing, using e.g. scraped-surface heat exchangers or homogenizers or by subjecting the solution to high linear flow rates which promote turbulence.

It is also possible to prepare the denatured whey protein compositions using low shear or non-shear particulation methods. Such methods typically involve the use of relatively low concentrations of whey protein during heat treatment and precise control of the pH and the concentration of calcium.

The amount (% w/w relative to the total amount of protein) of insoluble whey protein particles is determined according to Example 1.1.

The terms "particle size" and "volume weighted mean particle diameter", when used herein, refer to the volume weighted mean particle diameter, D[4,3]. The volume weighted mean particle diameter is measured according to Example 1.1.

In the context of the present invention, the term "total protein" pertains to the total amount of true protein of a composition or product and disregards non-protein nitrogen (NPN). Total protein is measured according to example 1.4.

In the context of the present invention, the "weight ratio" (w/w) between two components A and B is determined as the weight of component A divided by the weight of component B. Thus if a composition contains 9% (w/w) A and 6% (w/w) B, the weight ratio would be 9%/6%=1.5.

In the context of the present invention, the phrase "Y and/or X" means "Y" or "X" or "Y and X". Along the same line of logic, the phrase "$n_1$, $n_2$, . . . , $n_{i-1}$, and/or $n_i$" means "$n_1$" or "$n_2$" or . . . or "$n_{i-1}$" or "$n_i$" or any combination of the components: $n_1$, $n_2$, . . . $n_{i-1}$, and $n_i$.

In some preferred embodiments of the invention, the total amount of whey protein of the liquid composition is at least 6% (w/w). Preferably, the total amount of whey protein of the liquid composition is at least 8% (w/w). More preferably, the total amount of whey protein of the liquid composition is at least 10%. Most preferably, the total amount of whey protein of the liquid composition is at least 12% (w/w).

For example, the total amount of whey protein may be in the range of 4-25% (w/w), preferably in the range of 6-20% (w/w), preferably in the range of 8-18% (w/w), more preferably in the range of 10-16% (w/w) and even more preferably in the range of 12-14% (w/w).

As stated above, the whey protein contains a significant amount of insoluble whey protein particles.

The whey protein may for example comprise insoluble whey protein particles in an amount of at least 30% (w/w) relative to the total amount of whey protein. Preferably, the whey protein comprises insoluble whey protein particles in an amount of at least 40% (w/w) relative to the total amount of whey protein. More preferably, the whey protein may comprise insoluble whey protein particles in an amount of at least 50% (w/w) relative to the total amount of whey protein. Even more preferably, the whey protein comprises insoluble whey protein particles in an amount of at least 60% (w/w) relative to the total amount of whey protein. More preferably, the whey protein comprises insoluble whey protein particles in an amount of at least 70% (w/w) relative to the total amount of whey protein. More preferably, the whey protein comprises insoluble whey protein particles in an amount of at least 80% (w/w) relative to the total amount of whey protein. Even more preferably, the whey protein comprises insoluble whey protein particles in an amount of at least 90% (w/w) relative to the total amount of whey protein. More preferably, the whey protein comprises insoluble whey protein particles in an amount of about 100% (w/w) relative to the total amount of whey protein.

More preferably, the whey protein comprises insoluble whey protein particles in an amount in the range of 30-100% (w/w) relative to the total amount of protein, preferably in the range of 40-90% (w/w), and more preferably, in the range of 50-80% (w/w), even more preferably in the range of 60-80% (w/w).

The insoluble whey protein particles may be produced by heat-denaturation of dissolved whey protein at concentrations in the range of 1-30% (w/w). If the whey protein concentration is higher than approx. 5% (w/w), high shear levels are used during and/or after the denaturation to avoid formation of too large particles.

More details regarding the production of insoluble whey protein particles and sources containing them are found in U.S. Pat. No. 6,605,311, WO 2008/063,115, DE 19950240 A1, DE102012216990 A1, WO 2010/120199, WO 2007/110411 and WO2015/059248 A1 which all are incorporated herein by reference.

In some preferred embodiments of the invention, the source of insoluble whey protein particles is a denatured whey protein product prepared by subjecting a solution comprising soluble whey protein in an amount of 1-30% (w/w) and having a pH in the range of pH 5-8 to a temperature of at least 70 degrees C. for a duration sufficient to obtain at least 30% (w/w) insoluble whey protein particles relative to the total amount of whey protein. The denatured whey protein product may optionally be converted to a powder.

The solution comprising soluble whey protein preferably contains at least 50% protein relative to total solids. More preferably, the solution comprising soluble whey protein contains at least 60% protein relative to total solids. Even more preferably, the solution comprising soluble whey protein contains at least 70% protein relative to total solids. More preferably, the solution comprising soluble whey protein contains at least 80% protein relative to total solids. More preferably, the solution comprising soluble whey protein contains at least 90% protein relative to total solids and even more preferably, the solution comprising soluble whey protein contains about 100% protein relative to total solids.

In some preferred embodiments of the invention, the liquid composition has a volume weighted mean particle diameter of at most 50 micron. Preferably, the liquid composition has a volume weighted mean particle diameter of at most 40 micron. More preferably, the liquid composition has a volume weighted mean particle diameter of at most 30 micron. Even more preferably, the liquid composition has a volume weighted mean particle diameter of at most 20 micron. More preferably, the liquid composition has a volume weighted mean particle diameter of at most 10 micron. Even more preferably, the liquid composition has a volume weighted mean particle diameter of at most 5 micron. More preferably, the liquid composition has a volume weighted mean particle diameter of at most 1 micron.

In some preferred embodiments of the invention, the liquid composition has a volume weighted mean particle diameter in the range of 0.2-50 micron. Even more preferably, the liquid composition has a volume weighted mean particle diameter in the range of 0.3-30 micron. More preferably, the liquid composition has a volume weighted mean particle diameter in the range of 0.4-20 micron. Preferably, the liquid composition has a volume weighted mean particle diameter in the range of 0.5-10 micron. Most preferably, the liquid composition has a volume weighted mean particle diameter in the range of 0.5-5 micron.

In some preferred embodiments of the invention, the total amount of protein of the liquid composition is at least 4% (w/w). In other preferred embodiments of the invention, the total amount of protein of the liquid composition is at least 6% (w/w). Preferably, the total amount of protein of the liquid composition is at least 8% (w/w). More preferably, the total amount of protein of the liquid composition is at least 10%. Most preferably, the total amount of protein of the liquid composition is at least 12% (w/w).

For example, the total amount of protein may be in the range of 4-25% (w/w). Preferably the total amount of protein may be in the range of 6-22% (w/w). More preferably, the total amount of protein may be in the range of 8-18% (w/w). More preferably, the total amount of protein may be in the range of 10-16% (w/w). More preferably, the total amount of protein may be in the range of 12-14% (w/w). Even more preferably, the total amount of protein may be in the range of 11-13% (w/w).

In some preferred embodiments of the invention, at least 80% (w/w) of the total protein of the liquid composition is whey protein. Preferably, at least 85% (w/w) of the total protein of the liquid composition is whey protein. More preferably, at least 90% (w/w) of the total protein of the liquid composition is whey protein. Even more preferably, at least 95% (w/w) of the total protein of the liquid composition is whey protein. In some preferred embodiments of the invention, 98-100% (w/w) of the total protein of the liquid composition is whey protein.

In some preferred embodiments of the invention, the total amount of protein of the liquid composition comprises at most 20% (w/w) casein. More preferably, the total amount of protein of the liquid composition comprises at most 15% (w/w) casein. More preferably, the total amount of protein of the liquid composition comprises at most 10% (w/w) casein In some preferred embodiments of the invention, the total amount of protein of the liquid composition comprises at most 5% (w/w) casein. Preferably, the total amount of protein of the liquid composition comprises at most 4% (w/w) casein. Even more preferably, the total amount of protein of the liquid composition comprises at most 3% (w/w) casein.

In some preferred embodiments of the invention, the whey protein of the liquid composition of step a) comprises 3-30% (w/w) caseinomacropeptide (CMP), and preferably 10-20% (w/w) CMP. More preferred, the whey protein of the liquid composition of step a) may comprises 10-30% (w/w) caseinomacropeptide (CMP), and even more preferably 15-25% (w/w) CMP.

In some preferred embodiments of the invention the liquid composition comprises a total amount of $Ca^{2+}$ and $Mg^{2+}$ cations of at least 100 mg/100 ml. Preferably, the liquid composition comprises a total amount of $Ca^{2+}$ and $Mg^{2+}$ cations of at least 120 mg/100 ml. More preferably, the liquid composition comprises a total amount of $Ca^{2+}$ and $Mg^{2+}$ cations of at least 150 mg/100 ml. More preferably, the liquid composition comprises a total amount of $Ca^{2+}$ and $Mg^{2+}$ cations of at least 200 mg/100 ml. Even more preferably, the liquid composition comprises a total amount of $Ca^{2+}$ and $Mg^{2+}$ cations of at least 300 mg/100 ml, such as e.g. at least 320 mg/100 ml.

For example, the total amount of $Ca^{2+}$ and $Mg^{2+}$ cations of the liquid composition may be in the range of 120-800 mg/100 ml. Preferably, the total amount of $Ca^{2+}$ and $Mg^{2+}$ cations of the liquid composition may be in the range of 120-350 mg/100 ml. More preferably, the total amount of $Ca^{2+}$ and $Mg^{2+}$ cations of the liquid composition may in the range of 130-325 mg/100 ml. Even more preferably, the total amount of $Ca^{2+}$ and $Mg^{2+}$ cations of the liquid composition may in the range of 150-325 mg/100 ml. Preferably, the total amount of $Ca^{2+}$ and $Mg^{2+}$ cations of the liquid composition may in the range of 150-350 mg/100 ml.

In some preferred embodiments of the invention, the weight ratio between total protein and total amount of $Ca^{2+}$ and $Mg^{2+}$ cations is at most 90. More preferably, the weight ratio between total protein and total amount of $Ca^{2+}$ and $Mg^{2+}$ cations is at most 80. Even more preferably, the weight ratio between total protein and total amount of $Ca^{2+}$ and $Mg^{2+}$ cations is at most 70.

In other preferred embodiments of the invention, the weight ratio between total protein and total amount of $Ca^{2+}$ and $Mg^{2+}$ cations is at most 50. More preferably, the weight ratio between total protein and total amount of $Ca^{2+}$ and $Mg^{2+}$ cations is at most 35. Even more preferably, the weight ratio between total protein and total amount of $Ca^{2+}$ and $Mg^{2+}$ cations is at most 25.

In some preferred embodiments of the invention, the weight ratio between total protein and total amount of $Ca^{2+}$ and $Mg^{2+}$ cations is in the range of 5-100. More preferably, the weight ratio between total protein and total amount of $Ca^{2+}$ and $Mg^{2+}$ cations is in the range of 10-50. Even more preferably, the weight ratio between total protein and total amount of $Ca^{2+}$ and $Mg^{2+}$ cations is in the range of 15-35.

In other preferred embodiments of the invention, the weight ratio between total protein and total amount of $Ca^{2+}$ and $Mg^{2+}$ cations is in the range of 10-90. More preferably, the weight ratio between total protein and total amount of $Ca^{2+}$ and $Mg^{2+}$ cations is in the range of 15-80. Even more preferably, the weight ratio between total protein and total amount of $Ca^{2+}$ and $Mg^{2+}$ cations is in the range of 20-70.

The $Ca^{2+}$ and $Mg^{2+}$ cations may e.g. be present in the form of dissolved ions, bound in insoluble salts and/or complexed to components of the liquid composition.

In some preferred embodiments of the invention, at least 50% (w/w) of $Ca^{2+}$ and $Mg^{2+}$ cations are present in dissolved form in the liquid composition. Preferably, at least 70% (w/w) of $Ca^{2+}$ and $Mg^{2+}$ cations are present in dissolved form in the liquid composition. More preferably, at least 90% (w/w) of $Ca^{2+}$ and $Mg^{2+}$ cations are present in dissolved form in the liquid composition. Even more preferably, at least 95% (w/w) of $Ca^{2+}$ and $Mg^{2+}$ cations are present in dissolved form in the liquid composition.

Suitable sources of obtaining high concentrations of dissolved $Ca^{2+}$ and $Mg^{2+}$ are water-soluble salts of $Ca^{2+}$ and $Mg^{2+}$, such as e.g. $CaCl_2$ or $MgCl_2$.

In the context of the present invention, the term "water-soluble" means that the component in question has a solubility in demineralized water at 25 degrees C. of at least 2 g/100 mL.

In the context of the present invention, the term "water-insoluble" means that the component in question has a solubility in demineralized water at 25 degrees C. of at most 1 g/100 mL.

The relative amount of $Ca^{2+}$ and $Mg^{2+}$ cations which is in dissolved form is easily determined by measuring the total amount of $Ca^{2+}$ and $Mg^{2+}$ cations in the liquid composition, subsequently subjecting a sample of the liquid composition to centrifugation at 62000 g for 30 min, and determining the total amount of $Ca^{2+}$ and $Mg^{2+}$ cations in the supernatant. The relative amount of $Ca^{2+}$ and $Mg^{2+}$ cations which is on dissolved form is determined as the percentage of the total amount of $Ca^{2+}$ and $Mg^{2+}$ cations of the liquid composition which stays in the supernatant.

In other preferred embodiments of the invention, at most 49% (w/w) of $Ca^{2+}$ and $Mg^{2+}$ cations are present in dissolved form in the liquid composition. Preferably, at most 30% (w/w) of $Ca^{2+}$ and $Mg^{2+}$ cations are present in dissolved form in the liquid composition. More preferably, at most 20% (w/w) of $Ca^{2+}$ and $Mg^{2+}$ cations are present in dissolved form in the liquid composition. Even more preferably, at most 10% (w/w) of $Ca^{2+}$ and $Mg^{2+}$ cations are present in dissolved form in the liquid composition.

Suitable sources of obtaining high concentrations of insoluble $Ca^{2+}$ and $Mg^{2+}$ are water-insoluble salts of $Ca^{2+}$ and $Mg^{2+}$, such as e.g. calcium phosphate, magnesium phosphate, calcium carbonate, and/or magnesium carbonate. A particularly interesting source of insoluble $Ca^{2+}$ is milk mineral powders, which in addition to $Ca^{2+}$ often also contain significant amounts of $Mg^{2+}$.

Calcium is often present in the liquid composition in larger amounts than magnesium. The weight ratio between $Ca^{2+}$ and $Mg^{2+}$ may e.g. be in the range of 1-1000, preferably in the range of 10-100.

Alternatively, magnesium may be present in the liquid composition in larger amounts than calcium. Thus, the weight ratio between $Ca^{2+}$ and $Mg^{2+}$ may e.g. be in the range of 0.001-1, preferably in the range of 0.01-0.1.

The liquid composition may furthermore contain other divalent cations, such as e.g. iron, zinc, manganese, copper, or combinations thereof. However, these are typically present in lower concentrations than at least calcium. It is therefore not necessary to consider other divalent metal cations than calcium and magnesium when calculating the weight ratio between protein and the total amount of $Ca^{2+}$ and $Mg^{2+}$.

Addition of other ingredients such as fruits, lipids, carbohydrates, vitamins, sweeteners, carbohydrate based stabilizers and/or emulsifiers may take place during step b) preferably after the acidification and prior to a post-acidification heat treatment. In some embodiments, the addition of other ingredients takes place after the heat treatment step of step b).

In some particularly preferred embodiments, the acidified, liquid composition is subjected to a post-acidification heat treatment, subsequently subjected to the homogenization of step c) and finally mixed with a sterilized fruit preparation, preferably under aseptic conditions, and finally packaged.

In some preferred embodiments of the invention, the liquid composition of step a) furthermore comprises lipid. In some embodiments, the lipid comprises milk lipid and/or vegetable lipid. For example the liquid composition may comprise one or more milk lipid sources, e.g. selected from the group consisting of cream, butter, butter fat, anhydrous milk fat, whey fat, and combinations thereof.

In a preferred embodiment, the lipid source comprises or even consists essentially of cream.

In some preferred embodiments of the invention, at least 50% (w/w) of the lipid is in the form of milk fat globules. Preferably, at least 70% (w/w) of the lipid is in the form of milk fat globules. More preferably, at least 80% (w/w) of the lipid is in the form of milk fat globules. Even more preferably, at least 90% (w/w) of the lipid is in the form of milk fat globules.

Sources of insoluble whey protein particles may also contain milk lipid, e.g. in the range of 0.1-9% (w/w) relative to total solids. The source of insoluble whey protein particles may e.g. contain milk lipid, e.g. in the range of 1-6% (w/w) relative to total solids.

The vegetable lipid may comprise, or even consist of, a vegetable fat.

The vegetable fat may comprise one or more fat(s) selected from the group consisting of rapeseed oil, sunflower oil, olive oil, palm fat, palm kernel fat, and coconut fat, and a combination thereof.

Additionally, hydrogenated versions of the above-mentioned vegetable oils may also be useful as vegetable fats.

In a preferred embodiment, the liquid composition of step a) comprises lipid in an amount of at most 3% (w/w). Preferably, the liquid composition of step a) comprises lipid in an amount of at most 2% (w/w). Even more preferably, the liquid composition of step a) comprises lipid in an amount of at most 1% (w/w).

In a preferred embodiment, the liquid composition of step a) comprises lipid in an amount of at least 4% (w/w). Preferably, the liquid composition of step a) comprises lipid in an amount of at least 7% (w/w). Even more preferably, the liquid composition of step a) comprises lipid in an amount of at least 10% (w/w) and even more preferably, the liquid composition of step a) comprises lipid in an amount of at least 11% (w/w).

For example, the liquid composition of step a) comprises lipid in an amount in the range of 0.1-20% (w/w). In an embodiment, the liquid composition of step a) comprises lipid in an amount in the range of 4-18% (w/w). In another embodiment, the liquid composition of step a) comprises lipid in an amount in the range of 6-15% (w/w). In a preferred embodiment the liquid composition of step a) comprises lipid in an amount in the range of 8-12% (w/w). Most preferably the liquid composition of step a) comprises lipid in an amount in the range of 10-11% (w/w).

The liquid composition of step a) may furthermore comprise carbohydrate. The carbohydrate may e.g. comprise di- and/or mono-saccharide.

The carbohydrate normally comprises or even consists of sucrose, maltose, lactose, dextrose, glucose, fructose, galactose or a combination thereof.

In some preferred embodiments of the invention, the liquid composition contains a total amount of carbohydrate of at least 5% (w/w). Preferably, the liquid composition contains a total amount of carbohydrate of at least 10% (w/w), and even more preferably, the liquid composition contains a total amount of carbohydrate of at least 15% (w/w), even more preferably, the liquid composition contains a total amount of carbohydrate of at most 20% (w/w). Preferably, the liquid composition contains a total amount of carbohydrate of e.g. of at least 30% (w/w).

In other preferred embodiments, the total amount of carbohydrates is present in an amount of 7-16% (w/w). Preferably, the total amount of carbohydrates is present in an amount of 8-12% (w/w).

The inventors have observed that an improved stability and a reduced tendency to gel-formation of the liquid acidified dairy product seems to be obtained if the total amount of carbohydrates is at least 7% (w/w) and e.g. in the range of 7-16% (w/w).

In some embodiments of the invention, the liquid composition contains a total amount of carbohydrate of at most 4% (w/w). Preferably, the liquid composition contains a total amount of carbohydrate of at most 3% (w/w). Even more preferably, the liquid composition contains a total amount of carbohydrate of at most 2% (w/w). Even more preferably, the liquid composition contains a total amount of carbohydrate of at most 0.5% (w/w). Most preferably, the liquid composition contains a total amount of carbohydrate of at most 0.01% (w/w).

The carbohydrate may e.g. comprise or even consist of lactose.

In some preferred embodiments of the invention, the liquid composition contains a total amount of lactose of at most 10% (w/w), preferably at most 4% (w/w), and even more preferably at most 3 (w/w), even more preferably at most 2% (w/w), e.g. of at most 1% (w/w), such as at most 0.5% (w/w).

In other preferred embodiments, the total amount of lactose is present in an amount of 0.5-10% (w/w), e.g. such as 2-4% (w/w).

Alternatively, the liquid composition is lactose-reduced (less than 1.0 g lactose per 100 g) or even lactose-free (less than 0.01 g lactose per 100 g).

In some embodiments of the invention, the liquid composition contains a total amount of lactose of at most 4% (w/w). Preferably, the liquid composition contains a total amount of lactose of at most 3% (w/w). Even more preferably, the liquid composition contains a total amount of lactose of at most 2% (w/w), and even more preferably the liquid composition contains a total amount of lactose of at most 0.5% (w/w).

The liquid composition may furthermore comprise one or more vitamin(s) and similar other ingredients such as vitamin A, vitamin D, vitamin E, vitamin K, thiamine, riboflavin, pyridoxine, vitamin B12, niacin, folic acid, pantothenic acid, biotin, vitamin C, choline, vitamin B8, their salts, their derivatives and combinations thereof.

The content of the one of more vitamins may e.g. be in the range of 0.01-1% (w/w) relative to the dry weight of the liquid composition, preferably in the range of 0.1 to 0.5% (w/w).

In some preferred embodiments of the invention, the vitamin comprises or even consists essentially of vitamin D.

In some preferred embodiments, the liquid composition comprises vitamin D in an amount within the range of 0.5-2.5 microgram/100 ml, more preferably, the liquid composition comprises vitamin D in an amount within the range of 1.0-1.5 microgram/100 ml. Even more preferably, the liquid composition comprises vitamin D in an amount within the range of 1.1-1.3 microgram/100 ml, more preferably, the liquid composition comprises vitamin D in an amount within the range of 1.15-1.25 microgram/100 ml. In a preferred embodiment, the liquid composition comprises vitamin D in an amount of 1.2 microgram/100 ml.

In some embodiments of the invention, the liquid composition comprises both vitamin D and vitamin K.

The inventors have found that high protein, acidified, liquid dairy products fortified with both $Ca^{2+}$ and/or $Mg^{2+}$ cations and Vitamin D still have acceptable sensory properties.

The liquid composition of step a) typically comprises an amount of total solids (TS) in the range of 4-50% (w/w). Preferably, the liquid composition of step a) comprises an amount of total solids (TS) in the range for example of 10-45% (w/w). More preferably, the liquid composition of step a) comprises an amount of total solids (TS) in the range of 20-40% (w/w). Even more preferably, the liquid composition of step a) comprises an amount of total solids (TS) in the range of 28-38% (w/w). More preferably, the liquid composition of step a) comprises an amount of total solids (TS) in the range of 25-36% (w/w).

The liquid composition of step a) may furthermore comprise additional ingredients, such as e.g. sweetener, carbohydrate stabilizers and emulsifiers alone or in combinations.

The liquid composition may furthermore contain one of more non-carbohydrate natural or artificial sweetener.

In some embodiments, the liquid composition contains one or more natural sweetening agent(s) that are not sugars. These natural sweetening agent(s) may be provided as a component of a second sweetening agent, either alone, or in combination with a carbohydrate sweetener, as described. The natural non-carbohydrate sweetening agent(s) may for example be selected from the group consisting of *Momordica grosvenorii* (Mogrosides IV or V) extracts, Rooibos extracts, Honeybush extracts, *Stevia* extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose and/or natural polyols such as maltitol, mannitol, lactitol, sorbitol, inositol, xylitol, threitol, galactitol and combinations thereof.

In some embodiments, the liquid composition contains one or more artificial sweetening agent(s). These artificial sweetening agent(s) may be provided as a component of the first sweetener, either alone or in combination with other of the sweeteners as defined above. The artificial non-carbohydrate sweetening agent(s) may for example be selected from the group consisting of Aspartame, Cyclamate, Sucralose, Acesulfame K, neotame, Saccharin, Neohesperidin dihydrochalcone, *Stevia* extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR) and combinations thereof.

In some embodiments of the invention, it is particularly preferred that the sweetener comprises or even consists of one or more high intensity sweeteners (HIS). HIS are both found among the natural and artificial sweeteners and typically have a sweetening intensity of at least 10 times that of sucrose. Non-limiting examples of useful HIS are Aspartame, Cyclamate, Sucralose, Acesulfame K, neotame, Saccharin, Neohesperidin dihydrochalcone and combinations thereof.

In the context of the present invention the term "high intensity sweetener" pertains to a sweetener which provides a sweetness intensity (tested in water at 25 degrees C.) per g that is at least 10 times higher than that the sweetness intensity provided by sucrose.

If used, the total amount of HIS is typically in the range of 0.01-2% (w/w). For example, the total amount of HIS may be in the range of 0.05-1.5% (w/w). Alternatively, the total amount of HIS may be in the range of 0.1-1.0% (w/w).

It may furthermore be preferred that the sweetener comprises or even consists of one or more polyol sweetener(s). Non-limiting examples of useful polyol sweetener are maltitol, mannitol, lactitol, sorbitol, inositol, xylitol, threitol, galactitol or combinations thereof.

If used, the total amount of polyol sweetener is typically in the range of 1-20% (w/w). For example, the total amount of polyol sweetener may be in the range of 2-15% (w/w). Alternatively, the total amount of polyol sweetener may be in the range of 4-10% (w/w).

The liquid composition may furthermore contain carbohydrate-based stabilisers, such as e.g. locust bean gum, guar gum, alginates, cellulose, xanthan gum, carboxymethyl cellulose, microcrystalline cellulose, carrageenans, pectins, inulin and mixtures thereof.

The level of carbohydrate-based stabilisers can in some embodiments be reduced or even avoided. Thus in some preferred embodiments of the invention, the liquid composition comprises at most 1% (w/w) carbohydrate-based stabilisers, and preferably most 0.1% (w/w) carbohydrate-based stabilisers, and even more preferably no carbohydrate-based stabilisers.

The liquid composition may further comprise one of more emulsifier(s). Suitable emulsifiers to be used are mono- and di-glycerides, citric acid esters of mono- and di-glycerides, diacetyltartaric acid esters of mono- and di-glycerides polysorbate, lecithin, or polyol esters of fatty acids such as propylene glycol monoester of fatty acids, as well as natural emulsifiers such as egg yolk, butter milk, raw acacia gum, rice bran extract or mixtures thereof.

The content of the one of more emulsifier(s) may e.g. be in the range of 0.01-3% (w/w) relative to the total solids of the liquid composition, for example in the range of 0.1 to 0.5% (w/w).

In some embodiments, the emulsifiers are used alone or in combination with carbohydrate based stabilisers.

The pH of the liquid composition typically ranges from 6.0-7.0, when measured at 25 degrees C. Preferably, the pH is in the range of 6-6.5.

In some preferred embodiments of the invention, the liquid composition is prepared by mixing:
- a denatured whey protein product comprising a total amount of whey protein of at least 20% (w/w) of which at least 30% (w/w) is in the form of insoluble whey protein particles,
- Optionally a lipid source,
- Optionally, a carbohydrate source,
- Optionally additional ingredients,
- Water thereby preparing a mixture.

The denatured whey protein product is preferably based on a whey protein concentrate or a whey protein isolate. Preferably, the denatured whey protein product comprises a total amount of whey protein of at least 70% (w/w) of which at least 50% (w/w) is in the form of insoluble whey protein particles. Even more preferably, the denatured whey protein product comprises a total amount of whey protein of at least 75% (w/w) of which at least 60% (w/w) is in the form of insoluble whey protein particles.

The denatured whey protein product preferably has a volume weighted mean particle diameter of at most 5 micron. Preferably, denatured whey protein product preferably has a volume weighted mean particle diameter of at most 4 micron. More preferably, the denatured whey protein product preferably has a volume weighted mean particle diameter of at most 3 micron. Even more preferably, the denatured whey protein product preferably has a volume weighted mean particle diameter of at most 2 micron. Most preferably, the denatured whey protein product preferably has a volume weighted mean particle diameter of at most 1 micron.

In a preferred embodiment, the mixture furthermore comprises a lipid source. In a preferred embodiment, the lipid source comprises or even consists essentially of cream. Preferably the lipid source is present in the mixture in an amount in the range of 0.1-20% (w/w). More preferably, the lipid source is present in the mixture in an amount in the range of 8-12% (w/w).

In a preferred embodiment, the mixture furthermore comprises a carbohydrate source. In a preferred embodiment, the carbohydrate source is present in the mixture in an amount of 0.1-30% (w/w). More preferably, the carbohydrate source is present in the mixture an amount in the range of 7-16% (w/w).

The mixture may furthermore comprise additional ingredients, such as e.g. vitamins, sweetener, carbohydrate stabilizers, emulsifiers, fruits alone or in combinations.

The mixture can be used directly as the liquid composition. Alternatively the mixture may be subjected to additional processing, such as e.g. hydration, preheating and/or homogenisation.

The liquid composition may advantageously be prepared by mixing the ingredients with an appropriate amount of water and letting the components of the mixture hydrate of 0.5-24 hours, preferably 1-2 hours, and typically at a temperature in the range of 1-60 degrees C., e.g. at a temperature in the range 1-10 degrees C.

The liquid composition of step a) may for example be provided by preheating the hydrated mixture to a temperature in the range of 40-65 degrees C., preferably in the range of 55-65 degrees C. and then homogenising the mixture. The homogenisation step typically involves a total pressure drop of 100-1000 bar, preferably 200-300 bar, and may e.g. be performed in a single or two-step mode. Preferably, the homogenisation is performed in a two-stage mode with a pressure drops of 150-250 bar in the first stage and a pressure drop of 20-70 bar in the second stage.

The pH of liquid mixture is typically in the range of pH 6-8, preferably in the range of pH 6-7, such as e.g. in the range of pH 6.1-6.7.

Step b) involves subjecting the liquid composition to at least one acidification step and at least one heat treatment step. These steps may be implemented in any order.

The heat-treatment of step b) may be a heat-treatment step performed prior to the acidification, in which case it is referred to as a pre-acidification heat-treatment. Alternatively, the heat-treatment of step b) may be a heat-treatment step performed prior to the acidification, in which case it is referred to as a post-acidification heat-treatment.

In some preferred embodiments of the invention, step b) comprises subjecting the liquid composition to pre-acidification heat treatment followed by an acidification step.

The use of a pre-acidification heat treatment is particularly useful if the acidification involves prolonged incubation using e.g. bacterial cultures and elevated temperatures that allow for accelerated microbial growth.

In other preferred embodiments of the invention, step b) comprises subjecting the liquid composition to pre-acidification heat treatment followed by an acidification step followed by post-acidification heat treatment.

The benefit of a post-acidification step is that the microbial load of the acidified liquid composition is reduced and that the shelf-life of the product is extended.

In yet other preferred embodiments of the invention, step b) comprises subjecting the liquid composition to an acidification step followed by post acidification heat treatment. However, the pre-acidification heat treatment is omitted. These embodiments are for example interesting when a chemical acidifying agent is added directly to the liquid composition without the use of bacterial cultures and where no prolonged incubation above 10 degrees C. is required.

In a preferred embodiment of the invention, the at least one heat treatment step of step b) comprises heating to a temperature of at least 60 degrees C. for a duration sufficient to obtain at least a 5-$\log_{10}$ reduction of viable *Escherichia coli*, i.e. 99.999% of would die.

In some preferred embodiments of the invention, the at least one heat treatment step of step b) comprises heating to a temperature of at least 72 degrees C. for a duration sufficient to obtain at least a 5-$\log_{10}$ reduction of viable *Escherichia coli*, for example at least 15 seconds.

In other preferred embodiments of the invention, the at least one heat treatment step of step b) comprises heating to a temperature of at least 80 degrees C. for a duration sufficient to obtain at least a 5-$\log_{10}$ reduction of viable *Escherichia coli*, for example at least 5 minutes and preferably in the range of 5-20 minutes.

In a preferred embodiment of the invention the temperature of the at least one heat treatment step of step b) is in the range of 30-95 degrees C. for duration of 5 to 15 minutes.

In some preferred embodiments of the invention, the post-acidification process heats the acidified, liquid composition to 68-95 degrees C. for 25-60 seconds. This may be perceived as, and is used as a thermisation process which extends the shelf-life of the acidified dairy product.

The inventors have seen indications that the present invention also provides lower viscosities in high protein, acidicified liquid dairy products that have been subjected to thermisation.

In some preferred embodiments of the invention, the heat-treatment steps of step b) is followed by cooling the liquid composition to a temperature at most 50 degrees C. This is particularly the case with the pre-acidification heat-treatment which preferably is followed by cooling to at most 50 degrees C. or the temperature at which the incubation takes place.

The cooling may alternatively cool the liquid composition to a temperature of at most 10 degrees C., preferably at most 6 degrees C.

In some preferred embodiments of the invention, a post-acidification heat-treatment is followed immediately by the homogenization of step c) without active cooling between step b) and c). In these embodiments it is furthermore advantageous to warm-fill and seal the high protein, acidified, liquid dairy products in suitable containers.

In step b), the liquid composition of step a) is subjected to at least one acidification step using an acidifying agent.

In a preferred embodiment of the invention, the acidifying agent is a bacterial culture, typically referred to as a starter culture, in which case the addition of the acidifying agent may be perceived as an inoculation of the cooled liquid composition, in which case one obtains an inoculated liquid composition.

Thus, in some embodiments of the invention, the acidifying agent comprises a chemical acidifying agent.

In the context of the present invention, the term "chemical acidifying agent" pertains to a chemical compound capable of gradual or instantaneous reduction of the pH of the mixture.

The chemical acidifying agent may for example be a food acceptable acid (also referred as a food acid) and/or a lactone. Examples of useful acids are carboxylic acids, such as citric acid, tartaric acid and/or acetic acid. An example of a useful lactone is glucono delta-lactone (GDL).

In some embodiments of the invention, the chemical acidifying agent comprises one or more components selected from the group consisting of acetic acid, lactic acid, malic acid, citric acid, phosphoric acid or glucono delta-lactone.

The actual concentration of the chemical acidifying agent depends on the specific formulation of liquid composition. It is generally preferred that the chemical acidifying agent is used in a sufficient amount to reduce the pH of the mixture to at most pH 5.5, and preferably at most pH 5.0, such as e.g. at most pH 4.6.

In some preferred embodiments of the invention, the acidifying agent comprises, or even is, a starter culture.

In principle, any type of starter culture traditionally used in making yoghurt-type acidified dairy product may be used. Starter cultures used in the dairy industry are normally mixtures of lactic acid bacterial strains, but a single strain starter culture may also be useful in the present invention. Thus, in preferred embodiments, the one or more starter culture organism of the present process is a lactic acid bacterial species selected from the group consisting of *Lactobacillus, Leuconostoc, Lactococcus*, and *Streptococcus*. Commercial starter culture comprising one or more of these lactic acid bacterial species may be useful in the present invention.

In some preferred embodiments of the invention, the starter culture comprises one or more halotolerant bacterial culture(s).

It is generally preferred that when the acidifying agent is a bacterial, the pH of the liquid composition is reduced to at most pH 5.5, and preferably at most pH 5.0, such as e.g. at most pH 4.6.

The amount of the added acidifying agent is typically relatively low compared to the amount of the liquid composition.

In some embodiments of the invention the acidifying agent dilutes the liquid composition by a factor of at most 1.05, preferably at most by a factor of 1.01, and even more preferably by a factor of at most 1.005.

Flavouring and/or aromatic agents may be added to the liquid composition in step a) or alternatively during and/or after step b) to obtain a flavoured acidified dairy product. Flavours may be added as solids, but are preferably added in the form of liquids. However, it is often preferred that the flavours are added after the acidification.

Flavour may be added as fruit. Fruit may be added in an amount of 2-30% (w/w), e.g. of 5-25% (w/w), such as 15-25% (w/w) e.g. approx. 20% (w/w). Fruit may e.g. be selected from the group consisting of strawberry, raspberry, blueberry, apple or rhubarb and combinations thereof.

During step b), the acidifying agent is allowed to reduce the pH of the liquid composition of step a).

If the liquid composition is an inoculated liquid composition, it is incubated under conditions permitting the starter culture to become metabolically active to produce the acidified liquid composition. In some preferred embodiments, the inoculated liquid composition is incubated at a temperature between 25 degrees C. and 43 degrees C., preferably between 36 and 42 degrees C. until the desired pH is reached. The fermentation may be stopped by decreasing the temperature to around 10° C.

If the liquid composition contains a chemical acidifying agent, the chemical acidifying agent will normally start reducing the pH of the mixture as soon as the chemical acidifying agent forms part of the mixture. Some chemical acidifying agents, such as lactones and slowly dissolving acids, will provide a gradual pH reduction as they react with water or are dissolved.

The temperature of the liquid composition during step b) is typically in the range of 20-50 degrees C., and preferably in the range of 32-45 degrees C.

Step c) involves homogenizing the acidified, heat-treated liquid composition and is optional. Thus, in some preferred embodiments of the invention, the method comprises step c). In other preferred embodiments of the invention, the method does not comprise step c).

Homogenisation is a well-known process in the art of dairy technology and may thus be performed e.g. as a one-stage or two-stage process.

The homogenisation of the liquid composition may for example be implemented as a two-stage process, wherein the first stage (homogenisation of the liquid composition before acidification) uses a pressure of 100-300 bar and the second stage (homogenisation of the liquid composition after acidification) uses a pressure drop of at least 20 bar, for example at least 30 bar, e.g. at least 50, or at least 100 bar.

The total pressure drop of the homogenisation may therefore be in the range of 5-1000 bar, for example 40-300 bar, e.g. 50-250 bar.

In some preferred embodiments of the invention, the homogenisation of step c) involves total pressure drop of 5-80 bar, such as e.g. a total pressure drop of 10-60 bar, similar to the process step that is often used for smoothing of yoghurt.

In other preferred embodiments, pasteurised fruit and/or other ingredients are added after the homogenising step c).

Step d) involves packaging of the high-protein, acidified liquid dairy product derived from the acidified heat treated liquid composition of step b) or c) and is optional.

If the high-protein, liquid, acidified dairy product is to be used as an ingredient for another food product, packaging is not required. Thus, in some preferred embodiments of the invention the present method therefore does not comprise step d).

However, in other preferred embodiments of the invention, the method of the invention comprises step d).

In the context of the present invention, the term "high-protein, acidified liquid dairy product derived from the acidified, heat-treated, liquid composition" means that at least 30% of the solids of the high-protein, acidified, liquid dairy product is provided by the acidified, heat-treated, liquid composition. Preferably, at least 50% of the solids of the high-protein, acidified, liquid dairy product is provided by the acidified, heat-treated, liquid composition. More preferred, at least 70% of the solids of the high-protein, acidified, liquid dairy product is provided by the acidified, heat-treated liquid composition. Even more preferred, at least 90% of the solids of the high-protein, acidified, liquid dairy product is provided by the acidified, heat-treated liquid composition. In some preferred embodiments of the invention, substantially all the solids of the high-protein, acidified, liquid dairy product is provided by the acidified, heat-treated liquid composition.

In some preferred embodiments, the high-protein, acidified liquid dairy product comprises, or even consists of the acidified, heat-treated, liquid composition and optionally one or more additional ingredients.

In some preferred embodiments, the high-protein, acidified, liquid dairy product comprises at least 40% (w/w) of the acidified, heat-treated, liquid composition and at most 60% (w/w) additional ingredients. Preferably, the high-protein, acidified, liquid dairy product comprises at least 50% (w/w) of acidified, heat-treated, liquid composition and at most 50% (w/w) additional ingredients. More preferably, the high-protein, acidified, liquid dairy product comprises at least 60% (w/w) of acidified heat-treated, liquid, composition and at most 40% (w/w) additional ingredients. Even more preferably, the high-protein, acidified, liquid dairy product comprises at least 70% (w/w) of the acidified, heat-treated, liquid composition and at most 30% (w/w) additional ingredients.

As described herein, the addition ingredient(s) could e.g. be a fruit preparation and/or sweetener.

In some preferred embodiments of the invention, the acidified, heat-treated liquid composition is a high-protein, acidified, liquid dairy product.

The packaging step d), may involve any suitable packaging techniques, and any suitable container may be used for packaging the high-protein, acidified, liquid dairy product.

The packaging of step d), may for example involve aseptic packaging, i.e. the product is packaged under aseptic conditions. For example, the aseptic packaging may be performed by using an aseptic filling system, and it preferably involves filling the product into one or more aseptic container(s).

Examples of useful containers are e.g. bottles, cartons, bricks, pouches and/or bags.

The packaging is preferably performed at or below room temperature. Thus, the temperature of the product is preferably at most 30 degrees C. during the packaging, preferably at most 25 degrees C. and even more preferably at most 20 degrees C., such as at most 10 degrees C.

The temperature of the product during packaging may for example be in the range of 2-30 degrees C., and preferably in the range of 5-25 degrees C.

Alternatively, the packaging may be performed by a temperature of at least 55 degrees C., e.g. when the method involves heat-treatment of the acidified product stream. Thus, the temperature of the product may be preferably at least 60 degrees C. during the packaging, such as e.g. at least 65 degrees C.

The temperature of the product during packaging may for example be in the range of 55-75 degrees C., and preferably in the range of 60-70 degrees C.

The present inventors have found that the shelf-life of the high-protein, acidified, liquid dairy product is improved by filling/packaging the yoghurt-like product while it is still warm. The packaging of the product is subsequently typically cooled to room temperature or to a temperature of at most 10 degrees C., such as e.g. approx. 4-5 degrees C.

In some preferred embodiments of the invention the method of preparing a high-protein, acidified, liquid dairy product, comprises the steps of
 a) providing a liquid composition
  comprising a total amount of whey protein in the range of 10-14% (w/w) of which at least 50% (w/w) is in the form of insoluble whey protein particles
  having volume weighted mean particle diameter of at most 15 micron,
  wherein at least 90% (w/w) of the total protein is whey protein,
  comprising at least 5% (w/w) lipid, preferably in the form of milk fat globules, and
 b) subjecting the liquid composition of step a) to a pre-acidification heat treatment step following by acidification step using an acidifying agent, which acidifying agent is a bacterial culture, and which acidification step is performed until a pH of at most 4.6 is reached, thereby obtaining an acidified heat-treated liquid composition,
 c) homogenizing the acidified heat-treated liquid composition, and
 d) packaging an acidified dairy product derived from the acidified, heat-treated liquid composition of step c), which acidified dairy product derived from the acidified comprises at least 60% (w/w) of acidified, heat-treated liquid composition of step c) and optionally also a fruit preparation,
 wherein $Ca^{2+}$ and $Mg^{2+}$ cations are present prior to step b) and/or added during or after step b) in an amount sufficient to obtain a weight ratio between the total amount of protein and the total amount of $Ca^{2+}$ and $Mg^{2+}$ cations in the range of 10-90, preferably 20-80, and more preferably 30-70, in the acidified, heat-treated, liquid composition.

In other preferred embodiments of the invention the method of preparing a high-protein, acidified, liquid dairy product, comprises the steps of
 a) providing a liquid composition
  comprising a total amount of whey protein in the range of 10-14% (w/w) of which at least 50% (w/w) is in the form of insoluble whey protein particles
  having volume weighted mean particle diameter of at most 15 micron,
  wherein at least 90% (w/w) of the total protein is whey protein,
  comprising at most 4% (w/w) lipid, preferably in the form of milk fat globules, and
 b) subjecting the liquid composition of step a) to a pre-acidification heat treatment step following by acidification step using an acidifying agent, which acidifying agent is a bacterial culture, and which acidification step is performed until a pH of at most 4.6 is reached, thereby obtaining an acidified heat-treated liquid composition,
 c) homogenizing the acidified heat-treated liquid composition, and
 d) packaging an acidified dairy product derived from the acidified, heat-treated liquid composition of step c), which acidified dairy product derived from the acidified comprises at least 60% (w/w) of the acidified, heat-treated liquid composition of step c), and optionally also a fruit preparation,
 wherein $Ca^{2+}$ and $Mg^{2+}$ cations are present prior to step b) and/or added during or after step b) in an amount sufficient to obtain a weight ratio between the total amount of protein and the total amount of $Ca^{2+}$ and Mg$^{2+}$ cations in the range of 10-90, preferably 20-80, and more preferably 30-70, in the acidified, heat-treated, liquid composition.

Yet an aspect of the invention pertains to a high-protein, acidified, liquid dairy product obtainable according to the method described herein.

Another aspect of the invention pertains to a high-protein, acidified, liquid dairy product:
- comprising a total amount of whey protein of at least 4% (w/w) of which at least 30% is in the form of insoluble whey protein particles
- having volume weighted mean particle diameter of at most 50 micron,
- wherein at least 80% (w/w) of the total protein is whey protein
- having a weight ratio between the total amount protein and the total amount of Ca$^{2+}$ and Mg$^{2+}$ cations of at most 100.

In some preferred embodiments of the invention, the total amount of Ca$^{2+}$ and Mg$^{2+}$ cations of the high-protein, acidified, liquid dairy product comprises at least 100 mg/100 ml. Preferably, the total amount of Ca$^{2+}$ and Mg$^{2+}$ cations of the high-protein, acidified, liquid dairy product comprises at least 120 mg/100 ml. More preferably, the total amount of Ca$^{2+}$ and Mg$^{2+}$ cations of the high-protein, acidified, liquid dairy product comprises at least 150 mg/100 ml and more preferably the total amount of Ca$^{2+}$ and Mg$^{2+}$ cations of the high-protein, acidified, liquid dairy product comprises at least 200 mg/100 ml, e.g. at least 300 mg/100 ml.

For example, the total amount of Ca$^{2+}$ and Mg$^{2+}$ cations of the high-protein, acidified, liquid dairy product may be in the range of 120-800 mg/100 ml. Preferably, the total amount of Ca$^{2+}$ and Mg$^{2+}$ cations of the high-protein, acidified, liquid dairy product may be in the range of 120-600 mg/100 ml. More preferably, the total amount of Ca$^{2+}$ and Mg$^{2+}$ cations of the high-protein, acidified, liquid dairy product may in the range of 130-500 mg/100 ml. Even more preferably, the total amount of Ca$^{2+}$ and Mg$^{2+}$ cations of the high-protein, acidified, liquid dairy product may in the range of 140-400 mg/100 ml. Preferably, the total amount of Ca$^{2+}$ and Mg$^{2+}$ cations cations of the high-protein, acidified, liquid dairy product may in the range of 150-350 mg/100 ml.

In some preferred embodiments of the invention, the weight ratio between total protein and total amount of Ca$^{2+}$ and Mg$^{2+}$ cations of the high-protein, acidified, liquid dairy product is at most 90. More preferably, the weight ratio between total protein and total amount of Ca$^{2+}$ and Mg$^{2+}$ cations is at most 80. Even more preferably, the weight ratio between total protein and total amount of Ca$^{2+}$ and Mg$^{2+}$ cations is at most 70.

In other preferred embodiments of the invention the weight ratio between total protein and total amount of Ca$^{2+}$ and Mg$^{2+}$ cations of the high-protein, acidified, liquid dairy product is at most 50. More preferably, the weight ratio between total protein and total amount of Ca$^{2+}$ and Mg$^{2+}$ cations is at most 35. Even more preferably, the weight ratio between total protein and total amount of Ca$^{2+}$ and Mg$^{2+}$ cations is at most 25.

In some preferred embodiments of the invention, the weight ratio between total protein and total amount of Ca$^{2+}$ and Mg$^{2+}$ cations is in the range of 5-100. More preferably, the weight ratio between total protein and total amount of Ca$^{2+}$ and Mg$^{2+}$ cations is in the range of 10-50. Even more preferably, the weight ratio between total protein and total amount of Ca$^{2+}$ and Mg$^{2+}$ cations is in the range of 15-35.

In other preferred embodiments of the invention, the weight ratio between total protein and total amount of Ca$^{2+}$ and Mg$^{2+}$ cations is in the range of 10-90. More preferably, the weight ratio between total protein and total amount of Ca$^{2+}$ and Mg$^{2+}$ cations is in the range of 15-80. Even more preferably, the weight ratio between total protein and total amount of Ca$^{2+}$ and Mg$^{2+}$ cations is in the range of 20-70.

The high-protein, acidified, liquid dairy product may furthermore comprise other divalent cations such as e.g. iron, zinc, copper, or combinations thereof.

In some preferred embodiments of the invention, the high-protein, acidified, liquid dairy product described herein is yoghurt, such as e.g. stirred yoghurt or a drinking yoghurt.

In some preferred embodiments of the invention, the high-protein, acidified, liquid dairy product is a drinking yoghurt, which may be perceived as low viscosity, drinkable yoghurt. A drinking yoghurt may for example have a viscosity of at most 400 cP, and typically in the range of 4-400 cP. For example, the viscosity of the drinking yoghurt may be in the range of 10-300 cP. The viscosity of the drinking yoghurt may e.g. be in the range of 15-250 cP. Alternatively, the viscosity of the drinking yoghurt may be in the range of 20-200 cP. The viscosity is measured according to Example 1.3, at 5 degrees C. with a shear rate of 300/s.

In other embodiments of the invention, the dairy product is a stirred yoghurt, which may for example have a viscosity of at most 2500 cP, and typically in the range of 350-2500 cP. For example, the viscosity of the stirred yoghurt may be in the range of 400-2000 cP. The viscosity of the stirred yoghurt may e.g. be in the range of 500-1500 cP. Alternatively, the viscosity of the stirred yoghurt may be in the range of 600-1250 cP. The viscosity is measured according to Example 1.3, at 5 degrees C. at a shear rate of 300/s.

The present inventors have found that the presence of significant amounts of Ca$^{2+}$ and/or Mg$^{2+}$ cations in the liquid dairy products is advantageous as it reduces the viscosity of the product. For example, when the weight ratio between the total protein and total amount of Ca$^{2+}$ and Mg$^{2+}$ cations is at most 100, the inventors have found that the viscosity is reduced compared to a similar product containing less Ca$^{2+}$ and Mg$^{2+}$ cations.

The high-protein, acidified, liquid dairy product may e.g. contain the types and amounts of protein ingredients, sweeteners, stabilisers, lipids, vitamins and minerals mentioned in the context of the liquid composition of step a) as described above.

In some preferred embodiments of the invention the high-protein, acidified, liquid dairy product:
- comprises a total amount of whey protein in the range of 10-14% (w/w) of which at least 50% is in the form of insoluble whey protein particles,
- has volume weighted mean particle diameter of at most 15 micron,
- wherein at least 90% (w/w) of the total protein is whey protein
- comprises at least 5% (w/w) lipid, preferably in the form of milk fat globules,
- has a pH of at most 4.6,
- has a weight ratio between the total amount protein and the total amount of Ca$^{2+}$ and Mg$^{2+}$ cations in the range of 10-90, preferably 20-80, and more preferably 30-70.

In other preferred embodiments of the invention the high-protein, acidified, liquid dairy product:
- comprises a total amount of whey protein in the range of 10-14% (w/w) of which at least 50% is in the form of insoluble whey protein particles,
- has volume weighted mean particle diameter of at most 15 micron, wherein at least 90% (w/w) of the total protein is whey protein,
comprises at most 4% (w/w) lipid,
has a pH of at most 4.6, and
has a weight ratio between the total amount protein and the total amount of $Ca^{2+}$ and $Mg^{2+}$ cations in the range of 10-90, preferably 20-80, and more preferably 30-70.

In some preferred embodiments of the invention, the whey protein of the high-protein, acidified, liquid dairy product comprises 3-30% (w/w) caseinomacropeptide (CMP), and preferably 10-20% (w/w) CMP. More preferred, the whey protein of the high-protein, acidified, liquid dairy product may comprise 10-30% (w/w) caseinomacropeptide (CMP), and even more preferably 15-25% (w/w) CMP.

Another aspect of the invention pertains to a protein/mineral powder
comprising a total amount of at least 20% (w/w) whey protein of which at least 30% (w/w) is in the form of insoluble whey protein particles,
having volume weighted mean particle diameter of at most 50 micron when suspended in water,
wherein at least 80% (w/w) of the total protein is whey protein, and
having a weight ratio between the total amount of protein and the total amount of $Ca^{2+}$ and $Mg^{2+}$ cations of at most 100.

In the context of the present invention, the term "protein/mineral powder" pertains to a composition comprising at least $Ca^{2+}$ and/or $Mg^{2+}$ cations. Typically mineral composition will contain both $Ca^{2+}$ and $Mg^{2+}$ cations.

In the context of the present invention, the term "powder" pertains to a product wherein the product contains water in an amount of at most 10% (w/w), preferably at most 7% (w/w), and even more preferably at most 5% (w/w).

The powder may e.g. comprise a total amount of at least 40% (w/w) whey protein of which at least 30% (w/w) is in the form of insoluble whey protein particles.

Preferably, the powder may comprise a total amount of at least 50% (w/w) whey protein of which at least 30% (w/w) is in the form of insoluble whey protein particles.

More preferably, the powder may comprise a total amount of at least 60% (w/w) whey protein, of which at least 30% (w/w) is in the form of insoluble whey protein particles.

Even more preferably, the powder may comprise a total amount of at least 70% (w/w) whey protein of which at least 30% (w/w) is in the form of insoluble whey protein particles.

The whey protein of the powder preferably comprises as least 50% (w/w) insoluble whey protein particles. Thus, the powder may e.g. comprise a total amount of at least 40% (w/w) whey protein, of which at least 50% (w/w) is in the form of insoluble whey protein. Preferably, the powder may comprise total amount of at least 50% (w/w) whey protein, of which at least 50% (w/w) is in the form of insoluble whey protein particles. More preferably, the powder may comprise a total amount of at least 60% (w/w) whey protein of which at least 50% (w/w) is in the form of insoluble whey protein particles. Even more preferably, the powder may comprise a total amount of at least 70% (w/w) whey protein of which at least 50% (w/w) is in the form of insoluble whey protein particles.

In some preferred embodiments of the invention, the protein/mineral powder has a volume weighted mean particle diameter of at most 50 micron, when suspended in water. Preferably, the protein/mineral powder has a volume weighted mean particle diameter of at most 40 micron. More preferably, the protein/mineral powder has a volume weighted mean particle diameter of at most 30 micron, when suspended in water. Even more preferably, the protein/mineral powder has a volume weighted mean particle diameter of at most 20 micron, when suspended in water. More preferably, the protein/mineral powder has a volume weighted mean particle diameter of at most 10 micron, when suspended in water. Even more preferably, the protein/mineral powder has a volume weighted mean particle diameter of at most 5 micron, when suspended in water. More preferably, the protein/mineral powder has a volume weighted mean particle diameter of at most 1 micron, when suspended in water.

More preferably, the protein/mineral powder has a volume weighted mean particle diameter in the range of 1-50 micron, when suspended in water. Even more preferably, the protein/mineral powder has a volume weighted mean particle diameter in the range of 5-40 micron, when suspended in water. More preferably, the protein/mineral powder has a volume weighted mean particle diameter in the range of 10-30 micron, when suspended in water. Preferably, the protein/mineral powder has a volume weighted mean particle diameter in the range of 2-15 micron, when suspended in water. Most preferably, the protein/mineral powder has a volume weighted mean particle diameter in the range of 5-10 micron when suspended in water.

In some preferred embodiments of the invention, the protein/mineral powder
comprises a total amount of whey protein in the range of 70-90% (w/w), of which at least 50% is in the form of insoluble whey protein particles,
has a volume weighted mean particle diameter of at most 50 micron when suspended in water,
wherein at least 80% (w/w) of the total protein is whey protein, and
has a weight ratio between the total amount of protein and the total amount of $Ca^{2+}$ and $Mg^{2+}$ cations of at most 100, preferably at most 50.

Alternatively, the protein/mineral powder may contain significant amounts of lipid and carbohydrate and in addition comprises protein and mineral. The liquid composition of step a) may advantageously be prepared by mixing such a powder with an appropriate amount of water.

In some preferred embodiments of the invention, the powder contains a total amount of lipid in an amount in the range of 5-35% (w/w), and preferably in the range of 10-30% (w/w).

In some preferred embodiments of the invention, the powder contains a total amount of carbohydrate in the range of 5-55% (w/w). Preferably, the powder contains a total amount of carbohydrate in the range of 20-50% (w/w). Even more preferably, the powder contains a total amount of carbohydrate of 24-45% (w/w).

In some preferred embodiments of the invention, the protein/mineral powder comprises
a total amount of whey protein of in the range of 20-50% (w/w) of which at least 50% is in the form of insoluble whey protein particles
has a volume weighted mean particle diameter of at most 50 micron when suspended in water,
has a total amount of lipid in the range of 10-35% (w/w), and
has a total amount of carbohydrate in the range of 20-50% (w/w),
wherein at least 80% (w/w) of the total protein is whey protein, and said protein/mineral powder having a weight ratio between the total amount of protein and the total amount of $Ca^{2+}$ and $Mg^{2+}$ cations of at most 100, preferably at most 50.

Yet another aspect of the invention pertains to use of the protein/mineral powder according to the protein/mineral powder described herein for producing a high-protein, acidified, liquid dairy product having a viscosity of at most 2500 cP at 5 degrees C., 300/s.

In some preferred embodiments of the invention, it pertains to the use of high-protein, acidified, liquid dairy product comprising
- a total amount of at least 4% (w/w) whey protein, of which at least 30% is in the form of insoluble whey protein particles,
- having volume weighted mean particle diameter of at most 50 micron,
- having a weight ratio between the total amount protein and the total amount of $Ca^{2+}$ and $Mg^{2+}$ cations of at most 100.

In some preferred embodiments of the invention, the high-protein, acidified, liquid dairy product comprises a total amount of $Ca^{2+}$ and $Mg^{2+}$ cations of at least 100 mg/100 ml. Preferably, the total amount of $Ca^{2+}$ and $Mg^{2+}$ cations of the liquid composition comprise at least 120 mg/100 ml. More preferably, the total amount of $Ca^{2+}$ and $Mg^{2+}$ cations of the liquid composition comprises at least 150 mg/100 ml, and more preferably, the total amount of $Ca^{2+}$ and $Mg^{2+}$ cations of the liquid composition comprises at least 200 mg/100 ml, e.g. at least 300 mg/100 ml.

For example, the total amount of $Ca^{2+}$ and $Mg^{2+}$ cations of the liquid composition may be in the range of 120-800 mg/100 ml, for example in the range of 150-350 mg/100 ml, e.g. in the range of 130-325 mg/100 ml in the range of 150-350 mg/100 ml.

In some preferred embodiments of the invention, the weight ratio between total protein and total amount of $Ca^{2+}$ and $Mg^{2+}$ cations of the protein/mineral powder is at most 90. More preferably, the weight ratio between total protein and total amount of $Ca^{2+}$ and $Mg^{2+}$ cations is at most 80. Even more preferably, the weight ratio between total protein and total amount of $Ca^{2+}$ and $Mg^{2+}$ cations is at most 70.

In other preferred embodiments of the invention, the weight ratio between total protein and total amount of $Ca^{2+}$ and $Mg^{2+}$ cations of the protein/mineral powder is at most 50. More preferably, the weight ratio between total protein and total amount of $Ca^{2+}$ and $Mg^{2+}$ cations is at most 35. Even more preferably, the weight ratio between total protein and total amount of $Ca^{2+}$ and $Mg^{2+}$ cations is at most 25.

In some preferred embodiments of the invention, the weight ratio between total protein and total amount of $Ca^{2+}$ and $Mg^{2+}$ cations is in the range of 5-100. More preferably, the weight ratio between total protein and total amount of $Ca^{2+}$ and $Mg^{2+}$ cations is in the range of 10-50. Even more preferably, the weight ratio between total protein and total amount of $Ca^{2+}$ and $Mg^{2+}$ cations is in the range of 15-35.

In other preferred embodiments of the invention, the weight ratio between total protein and total amount of $Ca^{2+}$ and $Mg^{2+}$ cations is in the range of 10-90. More preferably, the weight ratio between total protein and total amount of $Ca^{2+}$ and $Mg^{2+}$ cations is in the range of 15-80. Even more preferably, the weight ratio between total protein and total amount of $Ca^{2+}$ and $Mg^{2+}$ cations is in the range of 20-70.

Often, the protein/mineral powder contains other divalent metal cations in addition to calcium and/or magnesium. Examples of such additional divalent metal cations are e.g. iron, zinc, copper, or combinations thereof.

It should be noted that the embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

EXAMPLES

Example 1: Methods of Analysis

Example 1.1: Quantification of I) the Amount of Insoluble Whey Protein Particles and II) the Volume Weighted Mean Particle Diameter, D[4,3], of a Product Part I)—Quantification of the Amount of Insoluble Whey Protein Particles:

The amount of insoluble whey protein particles of a product is determined using the following procedure:
1. Make a 5% (w/w in water) suspension of the sample to be tested. If the product to be tested is a suspension, it should be standardised to a total solids content of 5% (w/w).
2. Let the resulting suspension hydrate for one hour with gentle agitation (stirring).
3. If the product to be analysed is a powder, homogenize the suspension at 200 bar at 15 degrees C.
4. Centrifuge a first portion of the suspension at 62000 g for 30 minutes. The procedure is performed at approx. 15 degrees C. using a refrigerated centrifuge 3-30K from SIGMA Laborzentrifugen GmbH and 85 mL tubes (Order no. 15076), in which the 5% suspension is filled so that the total weight of tube and sample amounts to 96 g.
5. Collect the resulting supernatant and analyse for total protein (true protein). The amount of total protein of the supernatant is referred to as "A".
6. Analyse a second portion of the suspension (not subjected to centrifugation) for total protein (true protein). The amount of total protein of the suspension is referred to as "B".

The amount of insoluble whey protein particles is calculated as: (B−A)/B*100% (w/w)

Part II) Determining the Volume Weighted Mean Particle Diameter, D[4,3], of the Product:
1. Prepare suspension of the product to be tested by following steps 1-3 of Part I) above.
2. Mix 1 mL sample with 24 mL 2 g/l SDS and mix by gentle stirring
3. Sufficient amounts of the diluted sample was transferred into the sampling unit containing deionized water as dispersant to obtain 5-10% laser obscuration, most typically 7-8%.
4. Start particle size distribution analysis by static light scattering and determine values for the volume weighted mean size, D[4,3].

Particle size distribution analysis is performed using a Malvern Mastersizer 3000 (Malvern Instruments Ltd., Worcestershire, UK) equipped with a HydroLV sample dispersion unit.

Parameters: Particle refractive index 1.4 (real part), 0.1 (imaginary part) and dispersant refractive index 1.33 were used, 2000 rpm stirring, A minimum of 10 measurements of 15 seconds were performed for each sample.

Data analysis: The data was fitted using the Mie scattering model (residuals<2%) using the general purpose setting and calculated for non-spherical shaped particles.

Example 1.2: Determination of Native Alpha-Lactalbumin, Beta-Lactoglobulin and CMP The content of native alpha-lactalbumin, beta-lactoglobulin and CMP was analyzed by HPLC 30 analysis at 0.4 ml/min. 25 μl filtered sample is injected onto 2 TSKgel3000PWxl (7.8 mm 30 cm, Tosohass, Japan) columns connected in series with attached precolumn PWxl (6 mm×4 cm, Tosohass, Japan) equilibrated in the eluent (consisting of 465 g MilliQ water, 417.3 g acetonitrile and 1 mL triflouroacetic acid) and using a UV detector at 210 nm. Quantitative determination of the contents of native alpha-lactalbumin ($C_{alpha}$), betalactoglobulin ($C_{beta}$), and caseinomacropeptide ($C_{CMP}$) was performed by comparing the peak areas obtained for the corresponding standard proteins with those of the samples.

Example 1.3: Determination of Viscosity

The viscosity of liquid products was measured on a rheometer (Model Discovery HR-2 from TA Instruments Ltd) mounted with a 40 mm 2.0° cone and plate geometry.

The measurement was performed at 5 degrees C. (both the temperature of the liquid sample and the relevant parts of the rheometer had a temperature of 5 degrees C.).
Procedure:
1. Sample Preparation Each sample is filled into bottles during processing and placed in the laboratory cooler (5° C.) to temperate for 1 day.
2. Setup Set up the program for measurement of the product on the TA instruments DHR-2, see "measuring samples"

Install the cone and plate geometry. Equilibrate the temperature of the system at 5° C. and verify conditioning of the system.
3. Measuring Sample Only the sample that is to be analysed is removed from the cool storage. Using a plastic pipette with a cut end, the sample is slowly mixed to ensure homogeneity. With a loading gap of 45 mm, the sample is gently placed in the center of the peltier plate and the measuring gap is slowly closed to 56 μm to minimize structure breakdown before measuring.

Before the measurement begins, a pre shear of 5 shear rates (1/s) in 30 secs are applied to condition the sample.

A flow ramp with a duration of 240.0 s in linear mode is applied from an initial shear rate of 20.0 to a final shear rate of 700.0/s at a sampling interval of 1 sec/pt.
4. Cleaning When the analysis is finished, the measuring geometry is dismantled and cleaned with water and soap and afterwards with cold water to temperate the system before the next measurement. Wipe the geometry dry and install it again for the next sample.
Results:

The viscosity is presented in the unit centipoise (cP) at a shear rate of 300/s unless otherwise stated.

The higher the measured cP values are, the higher the viscosity.
Materials:

For this procedure the following is required:
TA instruments Discovery HR-2 rheometer
Geometry: 40 mm 2.0° cone plate (Part #511406.901) with a peltier plate in steel from TA Instruments.

Example 1.4: Determination of Total Protein

The total protein content (true protein) of a sample is determined by:
1) Determining the total nitrogen of the sample following ISO 8968-1/2|IDF 020-1/2—Milk—Determination of nitrogen content—Part 1/2: Determination of nitrogen content using the Kjeldahl method.
2) Determining the non-protein nitrogen of the sample following ISO 8968-4|IDF 020-4—Milk—Determination of nitrogen content—Part 4: Determination of non-protein-nitrogen content.
3) Calculating the total amount protein as ($m_{total\ nitrogen}$ − $m_{non-protein-nitrogen}$)*6.38.

Example 1.5: Determination of the Water Content of a Powder

The water content of a food product is determined according to ISO 5537:2004 (Dried milk—Determination of moisture content (Reference method)). NMKL is an abbreviation for "Nordisk Metodikkomite for Nringsmidler".

Example 1.6: Determination of Ash Content

The ash content of a food product is determined according to NMKL 173:2005 "Ash, gravimetric determination in foods".

Example 1.7: Determination of the Total Solids of a Solution

The total solids of a solution may be determined according NMKL 110 $2^{nd}$ Edition, 2005 (Total solids (Water)—Gravimetric determination in milk and milk products). NMKL is an abbreviation for "Nordisk Metodikkomite for Nringsmidler".

The water content of the solution can be calculated as 100% minus the relative amount of total solids (% w/w).

Example 1.8: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.9: Determination of the Degree of Denaturation

The denaturation degree of the proteins of the denatured whey protein compositions was analyzed by size exclusion high-performance liquid chromatography (SE-HPLC). A Waters 600 E Multisolvent Delivery System, a Waters 700 Satellite Wisp Injector, and a Waters H90 Programmable Multiwavelength Detector (Waters, Milford, MA, USA) were used. The elution buffer was composed of 0.15 M Na2SO4, 0.09 M KH2PO4 and 0.01 M K2HPO4. The flow rate was 0.8 mL min-1 and the temperature 20° C.

Twenty-four hours prior to analysis, suspensions of the denatured whey protein compositions were prepared by using a sodium phosphate buffer (0.02 M) to obtain a final protein content of 0.1% (w/v). In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4.

A quantitative analysis of the native whey protein content was performed by comparing the peak areas obtained for the corresponding standard proteins with those of the samples. Afterwards, the denatured whey protein content of the denatured whey protein compositions were calculated by considering the total protein content of the samples and their quantified native protein. The degree of denaturation was calculated as $(w_{total\ protein} - w_{solutble\ protein})/w_{total\ protein} * 100\%$, wherein $w_{total\ protein}$ is the weight of total protein and $w_{solutble\ protein}$ is the weight of soluble protein.

Example 1.10: Determination of the Total Amounts of Calcium, Magnesium, Sodium, and Potassium The total amount of calcium, magnesium, sodium, and potassium cations are determined using a procedure in which the samples are first decomposed using microwave digestion and then the total amount of mineral(s) is determined using an ICP apparatus.

Apparatus:

The microwave is from Anton Paar and the ICP is an Optima 2000DV from PerkinElmer Inc.

Materials:
1 M $HNO_3$
Yttrium in 2% $HNO_3$
Suitable standards for calcium, magnesium, sodium, and potassium in 5% $HNO_3$ Pre-Treatment:

Weigh out a certain amount of powder and transfer the powder to a microwave digestion tube.

Add 5 mL 1M $HNO_3$. Digest the samples in the microwave in accordance with microwave instructions.

Place the digested tubes in a fume cupboard, remove the lid and let volatile fumes evaporate.

Measurement Procedure:

Transfer the pre-treated sample to the digitube using a known amount of Milli-Q water. Add a solution of yttrium in 2% HNO3 to the digestion tube (about 0.25 mL per 50 mL diluted sample) and dilute to known volume using Milli-Q water. Analyze the samples on the ICP using the procedure described by the manufacturer.

A blind sample is prepared by diluting a mixture of 10 mL 1M $HNO_3$ and 0.5 mL solution of yttrium in 2% $HNO_3$ to a final volume of 100 mL using Milli-Q water.

At least 3 standard samples are prepared having concentrations which bracket the expected sample concentrations.

Example 2: Production of a Denatured Whey Protein Product Comprising Insoluble Whey Protein Particles A denatured whey protein product was prepared using the following method:

Solution:

An aqueous solution containing sweet whey protein concentrate was prepared by dissolving the whey protein concentrate in water to obtain a dry-matter content of 16% and adjusting the pH to 6.4.

Denaturation and Microparticulation:

Denaturation and microparticulation was performed in a 6+6 Scraped Surface Heat Exchanger (SSHE), APV Shear Agglomerator, from APV/SPX, Denmark.

After passage through a holding cell (60 sec), the product was cooled down in a SSHE followed by a plate heat-exchanger (PHE) to 10° C.

During the heat-treatment (80 degrees C. for a duration of 10 minutes), the protein was denatured and particles having a volume weighted mean particle diameter of less than 5 micron were formed. The amount of insoluble whey protein particles was approx. 55% (w/w).

The product suspension was pumped to a storage tank, and some of it was subsequently dried to a powder by means of spray-drying.

Example 3: Production of High-Protein, Acidified, Liquid Dairy Product

Samples of high-protein, acidified, liquid dairy product were prepared using the following ingredients and the following procedure.

Procedure:

The dry ingredients were blended with the liquids and then allowed to hydrate at 5° C. for 1 hour. After the hydration, the mixture was preheated to 65 degrees C. and then homogenised in two stages at 250 bar and 50 bar at 42 degrees C., respectively. The mixtures were subsequently heat-treated to a temperature of 80 degrees C. for 5 minutes using a plate heat-exchanger and then cooled to 42° C. Once cooled, the heat-treated mixtures were mixed with a yoghurt starter culture (Culture YO-mix401, Chr. Hansen A/S, Denmark) in an amount of 0.02% and the inoculated mixtures were allowed to incubate at 42° C. until a pH of less than 4.6 was reached.

The acidified mixtures were subjected to smoothing at 42° C. using a smoothing valve and a pressure drop of 50 bar.

The resulting smoothened high-protein, acidified liquid dairy products were finally cooled to 5° C. and packaged. The inventors have found that the volume weighted mean particle diameter of high-protein, acidified liquid dairy products like the above typically is in the range of 5 to 10 micron.

Ingredients and Sample Composition:

An overview of the used ingredients are shown in table 2 below. In this example $Ca^{2+}$ and $Mg^{2+}$ cations were added to sample 1 and 2 in the form of a "milk mineral concentrate". The composition of the milk mineral composition is given in table 1.

TABLE 1

| Composition of the milk mineral concentrate. | |
| --- | --- |
| Protein | Max 3% |
| Lactose | 6-10% |
| Fat | Max. 1% |
| Ash | 70-78% |
| Moisture | Max 5% |
| Sodium | Approx. 0.7% |
| Magnesium | Approx. 0.7% |
| Phosphorous | 10-15% |
| Chloride | Approx. 0.7% |
| Potassium | Approx. 0.6% |
| Calcium | 24-30% |

TABLE 2

Overview of ingredients for producing the plain reference and sample 1 and 2 of the high-protein, acidified, liquid dairy product.

| Sample no. | Reference | Sample 1 200 mg added calcium | Sample 2 320 mg added calcium |
|---|---|---|---|
| Ingredients % w/w | | | |
| Water | 51.9 | 51.06 | 50.55 |
| Cream, 38% fat | 28.6 | 28.60 | 28.60 |
| Denatured whey protein powder of example 2 | 14.5 | 14.50 | 14.50 |
| Sugar | 5 | 5 | 5 |
| Milk mineral concentrate | — | 0.84 | 1.35 |
| Nutritional composition % (w/w) | | | |
| Protein | 12.56 | 12.60 | 12.60 |
| Fat | 11.88 | 11.90 | 11.90 |
| Carbohydrate | 6.56 | 6.7 | 6.67 |
| Total solids | 31.50 | 32.8 | 32.77 |
| Lactose | 1.57 | 1.7 | 1.68 |
| Calcium | 0.08 | 0.28 | 0.40 |
| Energy kJ | 765/100 g | 768/100 g | 768/100 g |
| Energy kcal | 183/100 g | 184/100 g | 184/100 g |

Viscosity of the samples in table 2 was measured as described in example 1.3. Thus the viscosity was measured:
After pasteurisation and homogenisation (i.e. before acidification).
After acidification (fermentation to pH 4.6) and
After final homogenisation and cooling.

Results:
The viscosity data for "reference" and "sample 2" are summarised in table 3 below.

TABLE 3

Viscosity data for "Reference" and "Sample 2".

| | Reference Viscosity, cP at 5 degrees C., at a shear of 300/s | Sample 2, 320 mg Ca ions added. Viscosity, cP at 5 degrees C., at a shear of 300/s |
|---|---|---|
| After pasteurisation and homogenisation. Before acidification | 92 | 71 |
| After acidification (fermentation at pH 4.6) | 8401 | 303 |
| After final homogenisation and cooling. | 183 | 55 |

The data demonstrates that already after pasteurisation and homogenisation there was a small difference between the viscosity of the Reference and Sample 2. The viscosity of Sample 2 was 71 cP, while the viscosity of the Reference was 92 cP.

This difference became more pronounced when the viscosity was measured after acidification using a fermentation to pH 4.6. The viscosity of Sample 2 was only 303 cP while the viscosity of the Reference was 8401 cP.

The difference in viscosity was also significant for the final product after homogenisation; there the viscosity of Sample 2 was 55 cP, and the viscosity of the Reference was 183 cP.

It has thus been found that addition of calcium to the high-protein, liquid dairy product surprisingly reduces the viscosity, not only in the final product, but also during preparation of the product.

An advantage of the reduced viscosity of the acidified, liquid composition is that less energy is required for homogenisation. The high-protein, acidified, liquid dairy products can therefore be produced at lower cost.

The viscosity in sample 1 containing 200 mg was also measured and a similar pattern of reduced viscosity as for sample 2 was observed.

Example 4: Effect of Addition of $CaCl_2$, $H_2PO_4$ and Milk Mineral (Insoluble $Ca/PO_4$) to High-Protein, Acidified, Liquid Dairy Products The purpose of this example was to investigate whether addition of soluble Ca ions or a milk mineral composition comprising both calcium and phosphate ions (table 1) or addition of Phosphate ions as such, before or after acidification had an effect on the viscosity. The purpose was also to investigate whether both the phosphate ions and the calcium ions in the milk mineral precipitate contribute to the reduced viscosity.

The samples were prepared following the procedure of Example 3.

The samples were tested using the below protocol:
1) Test 5*100 g samples of the mixture after pasteurisation and 5-100 g samples of the final product after homogenisation.
2) Measure pH.
3) Measure viscosity using the method described in example 1.3, with three repetitions.
4) $CaCl_2$, Milk mineral composition or $H_2PO_4$ was added in accordance with table 4 below.
5) Stir the mixture for about 1 hour.
6) Cool at 5 degrees C. for about 1 hour.
7) Measure pH.
8) Measure viscosity, with three repetitions.
9) Let the samples rest overnight at 5 degrees C.
10) Measure pH.
11) Measure viscosity, with three repetitions.
12) Centrifuge 62000xg/30 min Results:
The viscosity data are summarised in table 4 below.

TABLE 4

Viscosity data for "Reference" and "Ca ions", "milk mineral composition" and "phosphate ions", measured at 5 degrees C. and 300/s.

| | pH before addition | Viscosity before (cP) | Addition | pH after 2 hours | Viscosity after 2 hours | pH after 20 hours | Viscosity after 10 hours |
|---|---|---|---|---|---|---|---|
| Liquid composition after heat treatment and before acidification | | | | | | | |
| Reference | 6.46 | 58.7 | none | 6.50 | 58.3 | 6.45 | 66.5 |
| +$CaCl_2$ | 6.46 | 58.7 | 1.110 g $CaCl_2$ | 5.99 | 88.5 | 6.02 | 128 |

TABLE 4-continued

Viscosity data for "Reference" and "Ca ions", "milk mineral composition" and "phosphate ions", measured at 5 degrees C. and 300/s.

| | pH before addition | Viscosity before (cP) | Addition | pH after 2 hours | Viscosity after 2 hours | pH after 20 hours | Viscosity after 10 hours |
|---|---|---|---|---|---|---|---|
| +H$_2$PO$_4$ | 6.46 | 58.7 | 0.528 g H$_2$PO$_4$ | 6.04 | 57.6 | 6.09 | 78.3 |
| +milk mineral composition | 6.46 | 58.7 | 1.35 g milk mineral composition | 6.51 | 53.1 | 6.55 | 66.8 |
| Liquid composition after acidification and homogenization | | | | | | | |
| Reference | 4.41 | 84.5 | Ingen | 4.41 | 77.2 | 4.40 | 167 |
| +CaCl$_2$ | 4.41 | 84.5 | 1.11 g CaCl$_2$ | 4.33 | 37.9 | 4.30 | 50.5 |
| +H$_2$PO$_4$ | 4.41 | 84.5 | 0.528 g H$_2$PO$_4$ | 4.44 | 79.8 | 4.40 | 166 |
| +milk mineral composition | 4.41 | 84.5 | 1.35 g milk mineral composition | 4.95 | 32.9 | 4.99 | 41.4 |

Figure 1:
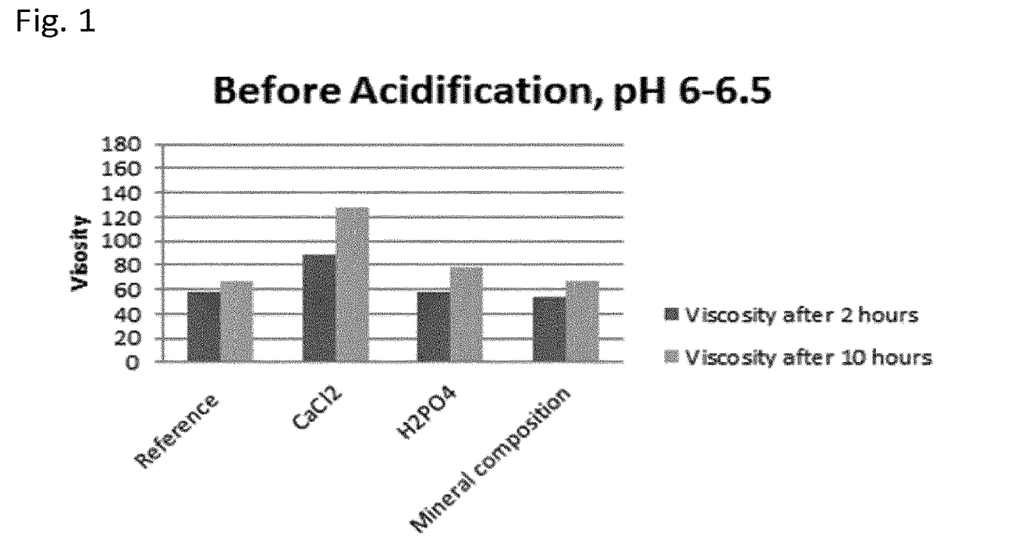
FIG. 1 shows the viscosity in different liquid compositions (reference, +$CaCl_2$, +$H_2PO_4$ or +milk mineral composition) measured after heat treatment and before acidification, pH is 6.0-6.5.
Figure 2:
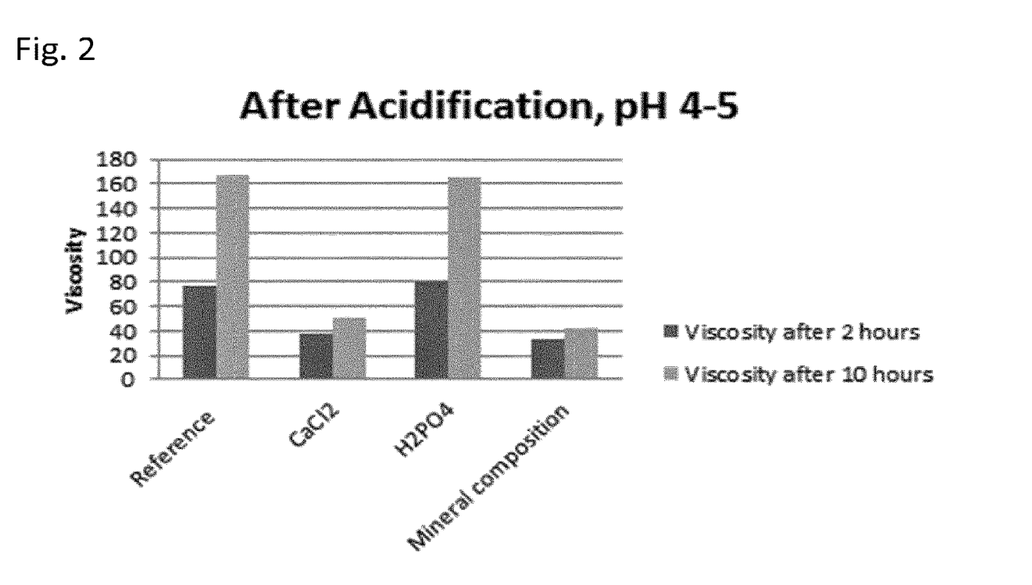
FIG. 2 shows the viscosity in different liquid compositions (reference, +CaCl$_2$, +H$_2$PO$_4$ or +milk mineral composition) measured after acidification and homogenization, pH is 4.0-5.0.

The results are also visualized in FIGS. 1 and 2. FIG. 1 shows the viscosity measured after addition of CaCl$_2$, H$_2$PO$_4$ or milk mineral composition to the liquid composition after heat treatment and before acidification, while FIG. 2 shows the viscosity measured after acidification and homogenization.

It was thus found that before acidification (see FIG. 1), the viscosity increased in the samples where Ca ions were added as CaCl$_2$, compared to the reference without added calcium. This may be due to the fact that the calcium ions at neutral pH can crossbind the microparticulated protein and hence increase the viscosity. Further, we did not see an effect when calcium ions were added in the form of the milk mineral composition. This is most likely due to the fact that the milk mineral composition was not dissolved at the neutral pH and therefore did not have an effect.

FIG. 2 clearly demonstrates that the positive effect of reducing the viscosity originated from either Ca ions as such or from the Ca-ions present in the milk mineral composition. The viscosity level was significantly lower (after 10 hours) after acidification in samples with Calcium ions added, compared to the reference sample.

It is also clear from the figure that the addition of phosphate ions did not have an impact on the viscosity in the liquid composition after acidification. Actually, the viscosity level after 10 hours in the reference sample and the sample with phosphate ions is at the same level after acidification after 10 hours see FIG. 2.

It has thus been demonstrated that adding Calcium ions, both as part of a milk mineral composition or as such, results in a significant reduction in viscosity of the final liquid dairy products. It has thus been demonstrated that the insoluble whey protein particles surprisingly are able to bind a high amount of divalent metal ions, such as calcium ions and low pH (such as pH 4.6), and thereby reducing the viscosity of the liquid dairy composition.

The invention claimed is:

1. A high-protein, acidified, liquid dairy product:
comprising a total amount of whey protein of at least 4% (w/w) of which at least 30% is in the form of insoluble particles of denatured whey protein,
having volume weighted mean particle diameter, D[4.3], of at most 50 micron,
wherein at least 90% (w/w) of total protein is whey protein, and
having a weight ratio between total amount protein and total amount of Ca$^{2+}$ and Mg$^{2+}$ cations of at most 50, where the total amount of Ca$^{2+}$ and Mg$^{2+}$ cations is at least 300 mg/100 ml,
and having a pH of at most 5.5.

2. The high-protein, acidified, liquid dairy product according to claim 1, wherein the total amount of Ca$^{2+}$ and Mg$^{2+}$ cations is at least 320 mg/100 ml.

3. The high-protein, acidified, liquid dairy product according to claim 1 having a viscosity of at most 2500 cP at 5 degrees Celsius at a shear rate of 300/s.

4. The high-protein, acidified, liquid dairy product according to claim 1, wherein the high-protein, acidified, liquid dairy product is yoghurt.

* * * * *